(12) United States Patent
Choi et al.

(10) Patent No.: US 11,353,730 B2
(45) Date of Patent: Jun. 7, 2022

(54) DISPLAY SUBSTRATE, METHOD OF MANUFACTURING THE SAME AND DISPLAY DEVICE HAVING THE SAME

(71) Applicant: Samsung Display Co., Ltd., Yongin-Si (KR)

(72) Inventors: Kook-Hyun Choi, Seoul (KR); Hyo-Taek Lim, Cheonan-si (KR); Dong-Ho Shin, Seongnam-si (KR); Young-Je Cho, Cheonan-si (KR); Yong-Jo Kim, Seoul (KR); Sang-Yong No, Seoul (KR); Sung-Hoon Kim, Seoul (KR); Hyo-Seop Kim, Cheonan-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/124,575

(22) Filed: Dec. 17, 2020

(65) Prior Publication Data
US 2021/0103172 A1 Apr. 8, 2021

Related U.S. Application Data

(60) Continuation of application No. 16/665,041, filed on Oct. 28, 2019, now Pat. No. 10,871,667, which is a (Continued)

(30) Foreign Application Priority Data

Oct. 19, 2009 (KR) .................. 10-2009-0099436

(51) Int. Cl.
*G02F 1/133* (2006.01)
*G02F 1/1345* (2006.01)
(Continued)

(52) U.S. Cl.
CPC ...... *G02F 1/13306* (2013.01); *G02F 1/13454* (2013.01); *G02F 1/133345* (2013.01);
(Continued)

(58) Field of Classification Search
None
See application file for complete search history.

(56) References Cited

U.S. PATENT DOCUMENTS 6,115,097 A 9/2000 Yamazaki
6,577,372 B2 6/2003 Zhang et al.
(Continued)

FOREIGN PATENT DOCUMENTS

JP 2005-049832 A 2/2005
JP 2007-235145 A 9/2007
(Continued)

*Primary Examiner* — Richard H Kim
(74) *Attorney, Agent, or Firm* — Innovation Counsel LLP

(57) ABSTRACT

A display substrate has first and second conductive layers separated from one another by an insulation layer. The first and second conductive layers are used to integrally form on the display substrate, pixel units in a relatively central display area of the substrate and integrated gate driving circuitry as well as associated wirings thereof in one or more peripheral areas. The first and second conductive layers are covered by a first protection layer made of a first electrically insulative material. A second and supplementing protection layer is provided on top of the first protection layer. The supplementing protection layer (buffer layer) is formed of a material different from that of the first protection layer so as to provide supplemental resistance against corrosive chemical agents and supplemental resistance against formation of cracks. In one class of embodiments, the supplementing protection layer is made of a same material as used form at least one of an alignment layer, sealing layer and spacer layer of the display substrate.

16 Claims, 15 Drawing Sheets

Related U.S. Application Data continuation of application No. 15/350,874, filed on Nov. 14, 2016, now Pat. No. 10,459,261, which is a continuation of application No. 14/167,330, filed on Jan. 29, 2014, now Pat. No. 9,494,811, which is a division of application No. 12/829,167, filed on Jul. 1, 2010, now Pat. No. 8,643,812.

(51) Int. Cl.
    *G02F 1/1362* (2006.01)
    *G02F 1/1333* (2006.01)
    *G02F 1/1337* (2006.01)

(52) U.S. Cl.
    CPC .. *G02F 1/136209* (2013.01); *G02F 1/136286* (2013.01); *G02F 1/1345* (2013.01); *G02F 1/133711* (2013.01); *G02F 1/136222* (2021.01); *G02F 2201/50* (2013.01); *G02F 2202/022* (2013.01)

(56) References Cited

U.S. PATENT DOCUMENTS

| | | |
|---|---|---|
| 7,333,160 B2 | 2/2008 | Zhang et al. |
| 7,583,350 B2 | 9/2009 | Chang et al. |
| 8,120,742 B2 | 2/2012 | Chen et al. |
| 10,871,667 B2 * | 12/2020 | Choi .................. G02F 1/13306 |
| 2002/0044229 A1 | 4/2002 | Kim |
| 2003/0058376 A1 | 3/2003 | Zhang |
| 2005/0195488 A1 | 9/2005 | McCabe et al. |
| 2006/0066801 A1 | 3/2006 | Liu et al. |
| 2007/0120152 A1 | 5/2007 | Chang et al. |
| 2007/0242179 A1 | 10/2007 | Song et al. |
| 2009/0147188 A1 | 6/2009 | Yang et al. |
| 2012/0320008 A1 | 12/2012 | Takahashi et al. |
| 2013/0270582 A1 | 10/2013 | Shin et al. |
| 2016/0238866 A1 | 8/2016 | Yamaguchi |

FOREIGN PATENT DOCUMENTS

| | | |
|---|---|---|
| JP | 2008-165028 A | 7/2008 |
| JP | 2008-165029 A | 7/2008 |
| JP | 2009-049243 A | 3/2009 |
| KR | 1020030026824 A | 4/2003 |
| KR | 1020040093948 A | 11/2004 |
| KR | 1020050088212 A | 9/2005 |
| KR | 1020070119339 A | 12/2007 |
| KR | 1020080006865 A | 1/2008 |

* cited by examiner

DISPLAY SUBSTRATE, METHOD OF MANUFACTURING THE SAME AND DISPLAY DEVICE HAVING THE SAME

PRIORITY STATEMENT

This application is a continuation application of U.S. patent application Ser. No. 16/665,041 filed on Oct. 28, 2019, which is a continuation application of U.S. patent application Ser. No. 15/350,874 filed on Nov. 14, 2016 (now U.S. Pat. No. 10,459,261), which is a continuation of U.S. patent application Ser. No. 14/167,330 filed on Jan. 29, 2014 (now U.S. Pat. No. 9,494,811), which is a divisional application of U.S. patent application Ser. No. 12/829,167 filed on Jul. 1, 2010 (now U.S. Pat. No. 8,643,812), which claims priority under 35 U.S.C. § 119 to Korean Patent Application No. 10-2009-0099436, filed on Oct. 19, 2009 in the Korean Intellectual Property Office (KIPO); where the disclosures of all said applications are incorporated herein by reference in their entirety.

BACKGROUND

1. Field of Disclosure

The present disclosure of invention relates to a display substrate, a method of manufacturing the display substrate and a display device having the display substrate. More particularly, example embodiments in accordance with the present disclosure relate to a display substrate having increased reliability, a method of manufacturing the display substrate and a display device having the display substrate.

2. Description of Related Technology

Generally, a liquid crystal display (LCD) device includes an LCD panel and a driving part for applying driving signals to the LCD panel. The LCD panel includes a display area and a peripheral area surrounding the display area. In the display area, a plurality of pixel parts are provided generally in the form of a matrix and are connected to gate wirings and data wirings and are configured to display images composed of corresponding pixels.

Conventionally, the gate wirings are driven by external gate driving integrated circuits. Recently however, in order to realize an LCD device having a small size, a light weight, a thin thickness, etc., it has been proposed that the gate driving circuitry which outputs the gate activation signals to the gate wirings should be monolithically integrated on the peripheral area of the LCD panel. The integrated gate driving circuitry generally includes a circuit part configured substantially for generating sequential gate activating signals and a plurality of wirings for delivering driving and control signals to the integrated gate driving circuitry. In one of the proposals, the integrated gate driving circuitry and associated wirings thereof are provided in an area that is covered by a liquid crystals material layer. (It is to be noted that this Description of Related Technology section may input disclosure that is not part of the prior art as publically known to those skilled in the relevant art.)

Given a relatively large LCD panel in which such an integrated gate driving circuit is directly formed at a peripheral area thereof and within an area covered by liquid crystals, where the large LCD panel is used for example as part of a relatively large-sized television set, the probability that defects such as open circuits or short circuits may be generated increases at crossing area of wirings of the LCD panel. The danger of such open circuits or short circuits is not typically of as much significance for LCD panels having a small size. However, among the many crossing wirings of a large-sized LCD panel, there is an increased chance that a fine crack or hole may develop in mechanically and/or chemically stressed areas where the developed crack extends through an insulation layer provided between wiring layers. The stress may develop due to differences of thermal expansion coefficients between one or more metal layers and corresponding protection/insulation layers provided in the crossing areas of wirings. The increased likelihood of shorting cracks or holes forming may be attributable to temperature increases associated with long use times, including long duration drivings of the integrated gate driving circuitry and due to temperature increases associated with use of high luminance backlight assemblies that are typically employed in large-sized TV sets meant for large audiences. One possible breakdown mechanism has, the overlapping liquid crystal molecules infiltrating through the thermally developed crack in such a way that an open circuit is generated due to chemical corrosion of exposed metal layers. Another possible breakdown mechanism has overlapping liquid crystal molecules infiltrating to an insulation layer between adjacent metals layers, for example by also infiltrating into a partially formed crack in a manner that weakens the voltage breakdown characteristics of the insulation and the latter leads to formation of further defects such as formation of open circuits and/or shorted together circuits or burnt out circuits. Consequently, formation of defects that can lead to formation of open circuits and/or shorted together circuits reduces the long term operational reliability of LCD panels including reducing the long term operational reliability of integrated gate driving circuits provided in large-sized LCD panels.

SUMMARY

In accordance with the disclosure, a display panel substrate is provided with an enhanced capability for protecting wiring parts from formation of wiring defects and in particular from formation of wiring defects in wirings associated with the integrated gate driving circuits of the display panel substrate where the integrated gate driving circuits and/or associated interconnect wirings thereof reside under a liquid crystals material layer.

Example embodiments of the present disclosure provide a method of manufacturing the above-mentioned display substrate.

Example embodiments of the present disclosure provide a display device having the above-mentioned display substrate.

According to one aspect of the present disclosure, a display substrate includes a pixel transistor, a gate driving part, an insulation layer, a protection layer and a buffer layer. The pixel transistor is disposed in a display area (DA) of a base substrate. The pixel transistor includes a first electrode and a second electrode disposed on the first electrode. The gate driving part is disposed on a peripheral area (PA) of the base substrate which surrounds the display area. The gate driving part includes a circuit part generating a gate signal, a first wiring electrically connected to the circuit part, and a second wiring electrically connected to the circuit part. The second wiring includes a wiring part disposed on the first wiring. An insulation layer is disposed on the base substrate to contact with the first electrode and the first wiring. A protection layer is disposed on the base substrate to contact with the second electrode and the second wiring. A supplemental buffer layer directly contacts with a protection layer over the wiring part. The buffer layer covers the wiring part and is formed from a different material (e.g., a polymer material) than that of the protection layer.

According to another aspect of the present disclosure, there is provided a method of manufacturing a display substrate including a gate driving part having a circuit part formed on a peripheral area surrounding a display area of a base substrate to generate a gate signal and a wiring part electrically connected to the circuit part. In the method, a first electrode of a pixel transistor is formed in the display area and a first wiring of the wiring part in the peripheral area. An insulation layer is formed on the base substrate on which a first metal pattern including the first electrode and the first wiring is formed. An insulation layer covers the first metal pattern. A second electrode of the pixel transistor is formed on the display area and a second wiring of the wiring part on the peripheral area. A protection layer is formed on the base substrate on which a second metal pattern including the second electrode and the second wiring is formed. The protection layer covers the second metal pattern. A buffer layer is formed on the protection layer of the wiring part. The buffer layer directly makes contact with the protection layer to cover the wiring part.

According to another aspect of the present disclosure, a display device includes a display substrate and an opposite substrate. The display substrate includes a pixel transistor, a gate driving part, an insulation layer, a protection layer and a buffer layer. The pixel transistor is disposed on a display area of a base substrate. The pixel transistor includes a first electrode and a second electrode disposed on the first electrode. The gate driving part is disposed on a peripheral area of the base substrate which surrounds the display area. The gate driving part includes a circuit part generating a gate signal, a first wiring electrically connected to the circuit part, and a second wiring electrically connected to the circuit part. The second wiring includes a wiring part disposed on the first wiring. An insulation layer is disposed on the base substrate to make contact with the first electrode and the first wiring. A protection layer is disposed on the base substrate to make contact with the second electrode and the second wiring. A buffer layer directly contacts with the protection layer on the wiring part. The buffer layer covers the wiring part and is formed from a polymer material. The opposite substrate faces the display substrate.

According to a display substrate, a method of manufacturing the display substrate and a display device having the display substrate, material from at least one of an alignment layer, a sealing layer, a light-blocking layer and a separation maintaining layer is used to form a supplemental buffer layer for preventing defects of wiring part of a gate driving part, so that wiring defects may be prevented. Therefore, reliability of the gate driving part may be improved.

BRIEF DESCRIPTION OF THE DRAWINGS

The above and other features and advantages of the present teachings will become more apparent by describing in detailed example embodiments thereof with reference to the accompanying drawings, in which.

DETAILED DESCRIPTION

Figure 1:
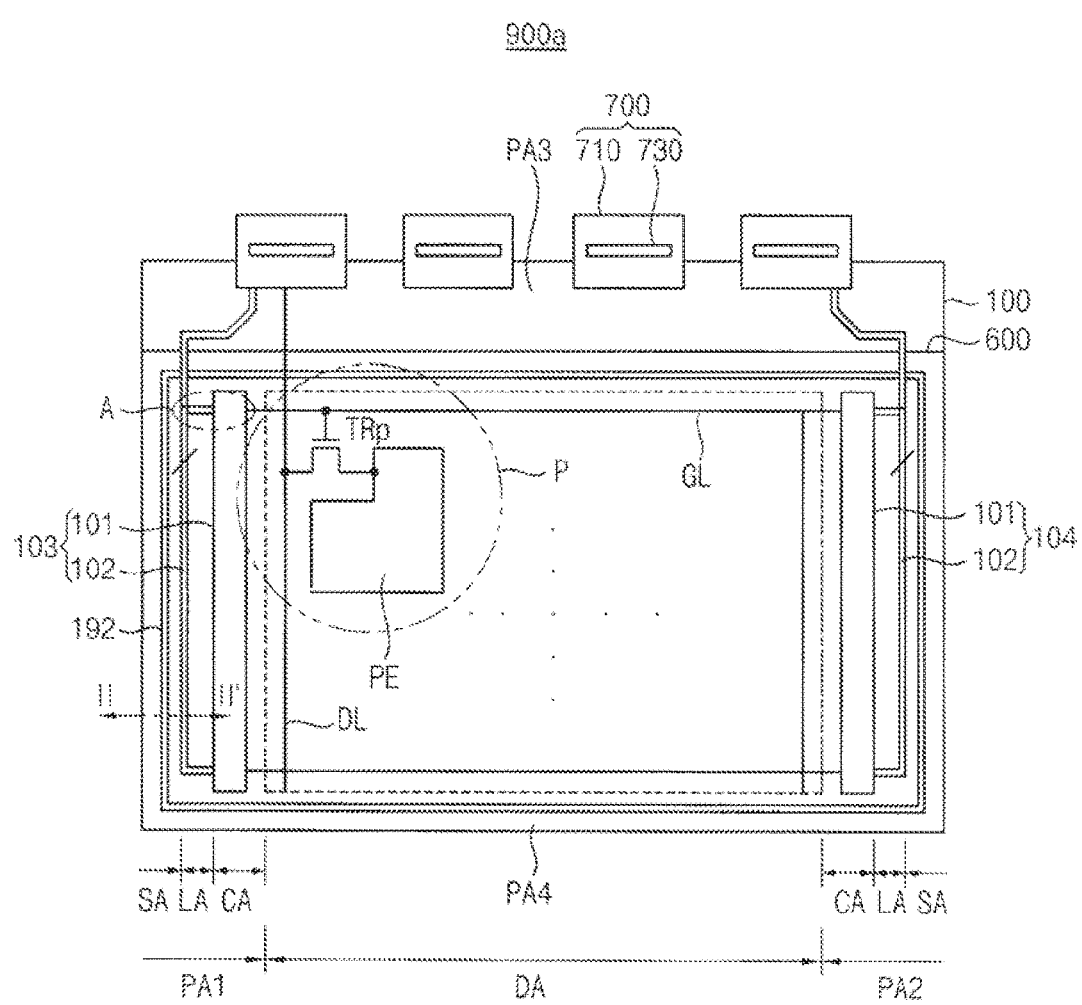
FIG. 1 is a plan view illustrating a display device according to one exemplary embodiment which has integrated gate driving circuitry and associated wirings provided in one or more peripheral areas of a substrate of the display device.

The present disclosure of invention is provided more fully hereinafter with reference to the accompanying drawings, in which example embodiments are shown. The present teachings may, however, be embodied in many different forms and should not be construed as limited to the example embodiments set forth herein. Rather, these example embodiments are provided so that this disclosure will be thorough and complete, and will fully convey the scope of the present teachings to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the present teachings.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present teachings. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present teachings.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure of invention will be explained in detail with reference to the accompanying drawings.

FIG. 1 is a plan view illustrating a display device according to one exemplary embodiment 900a.

Referring to FIG. 1, the display device 900a includes a first display substrate 100 (also known as TFT substrate), a second and opposite substrate 600 (also known as common electrode substrate) and a data lines driving part 700 (where part 700 may include one or more integrated circuits and flexible printed circuits connected to the display substrate 100).

The first display substrate 100 has a display area DA in its center and a plurality of peripheral areas PA1, PA2, PA3 and PA4 surrounding the display area DA.

A plurality of gate wirings GL (also known as Gate Lines, only one shown) are integrally provided on substrate 100. A plurality of data wirings DL (also known as Data Lines, only one shown) are also integrally provided on first substrate 100 so as to be crossing with the gate wirings GL. A plurality of pixel units P (only one shown) are further integrally provided so as to each be connected to a respective gate wiring GL and corresponding data wiring DL, where the pixel units P are formed on the display area DA in the form of a units addressing and driving matrix. Each of the pixel units P includes a pixel transistor TRp (or other switching element) connected to a respective gate wiring GL and a corresponding data wiring DL, and a pixel electrode PE electrically connected to a drain terminal of the pixel transistor TRp.

A first peripheral area PA1 is provided adjacent to a first terminal end of the gate wirings GL, and a second peripheral area PA2 is provided adjacent to a second terminal end of the gate wirings GL. A third peripheral area PA3 is disposed adjacent to first terminal ends of the data wirings DL, and a fourth peripheral area PA4 is provided adjacent to second terminal ends of the data wirings DL.

A first or left side integrated gate driving circuit (including wirings) 103 is disposed in the first peripheral area PA1 and a second or right side integrated gate driving circuit (including wirings) 104 is disposed in the second peripheral area PA2. A sealing layer or ring 192 is disposed to continuously extend through the first to fourth peripheral areas PA1, PA2, PA3 and PA4 and may be used to create a sealed space between the TFT and common electrode substrates (100, 600) within which a liquid crystals material layer can be substantially contained. Since, in this type of embodiment, the interior of the area sealed by sealing ring 192 encompasses LA and CA subareas of the first and second peripheral areas, PA1 and PA2, the LA and CA subareas (which will be further described shortly) reside in the area of the sealed-in liquid crystals material layer.

The first peripheral area PA1 includes a circuit sub-area CA wherein an active components or circuit part 101 of the first integrated gate driving circuit 103 is disposed. The first peripheral area PA1 further includes a wiring sub-area LA where a wiring part 102 is disposed and structured to deliver driving and/or control signals to the circuit part 101. The first peripheral area PA1 further includes a sealing-crossing area SA that extends under where the sealing layer or ring 192 is disposed. Since the sealing layer or ring 192 seals in liquid crystal material, it may be observed that the LA and CA sub-areas are disposed in an area that also contains sealed-in liquid crystal material. The wiring sub-area LA is adjacent to the circuit sub-area CA, and the sealing-crossing sub-area SA is adjacent to the wiring sub-area LA. The wiring part 102 provides the circuit part 101 with corresponding driving and/or control signals, and in response, the circuit part 101 generates a sequence of gate activating signals that are used to selectively drive the gate wirings GL for thereby selectively activating respective rows of pixels for writing new data into those pixels.

The second peripheral area PA2 similarly includes a circuit sub-area CA where a circuit part 101 of the second gate driving part 104 is disposed, a wiring sub-area LA where a wiring part 102 delivering a driving signal to the circuit part 101 is disposed, and a sealing-crossing sub-area SA extending under where the sealing layer 192 is disposed.

The wiring sub-area LA is adjacent to the circuit sub-area CA, and the sealing-crossing sub-area SA is adjacent to the wiring sub-area LA.

In one embodiment, the first and second gate driving parts 103 and 104 are each connected to identical gate wirings. In other words, each gate line GL has drive circuitry connected to both its left and right terminal ends. In an alternate embodiment, the first and second gate driving parts 103 and 104 are connected to different ones of the gate wirings GL. By way of example, the left gate driving part 103 may be connected to only odd numbered gate lines while the right gate driving part 104 may be connected to only even numbered gate lines. The respective wiring parts 102 of the first and second gate driving parts 103 and 104 provide the adjacent circuit parts 101 with corresponding driving and/or control signals, and in response the circuit parts 101 generate corresponding gate signals to apply to their respective gate wirings GL.

The opposite substrate 600 (common electrode substrate) is spaced apart from and faces the display substrate 100. The opposite substrate 600 is sealingly coupled to the display substrate 100 by means of the sealing layer or ring 192. A liquid crystal materials layer (not shown) is interposed between and sealingly contained between the display substrate 100 and the opposite substrate 600 by action of the sealing layer 192. Accordingly and as already mentioned, parts 101 an 102 of respective integrated gate driving circuits 103 and 104 are within an area where sealed-in liquid crystals material reside.

The data driving part 700 includes one or more flexible circuit substrates 710 and data driving chips 730 mounted on the respective flexible circuit substrates 710. The flexible circuit substrates 710 electrically connect to an external device (not shown) and to the data driving chip 730. The data driving chip 730 is electrically connected to the display substrate 100 through the flexible circuit substrate 710.

Figure 2:
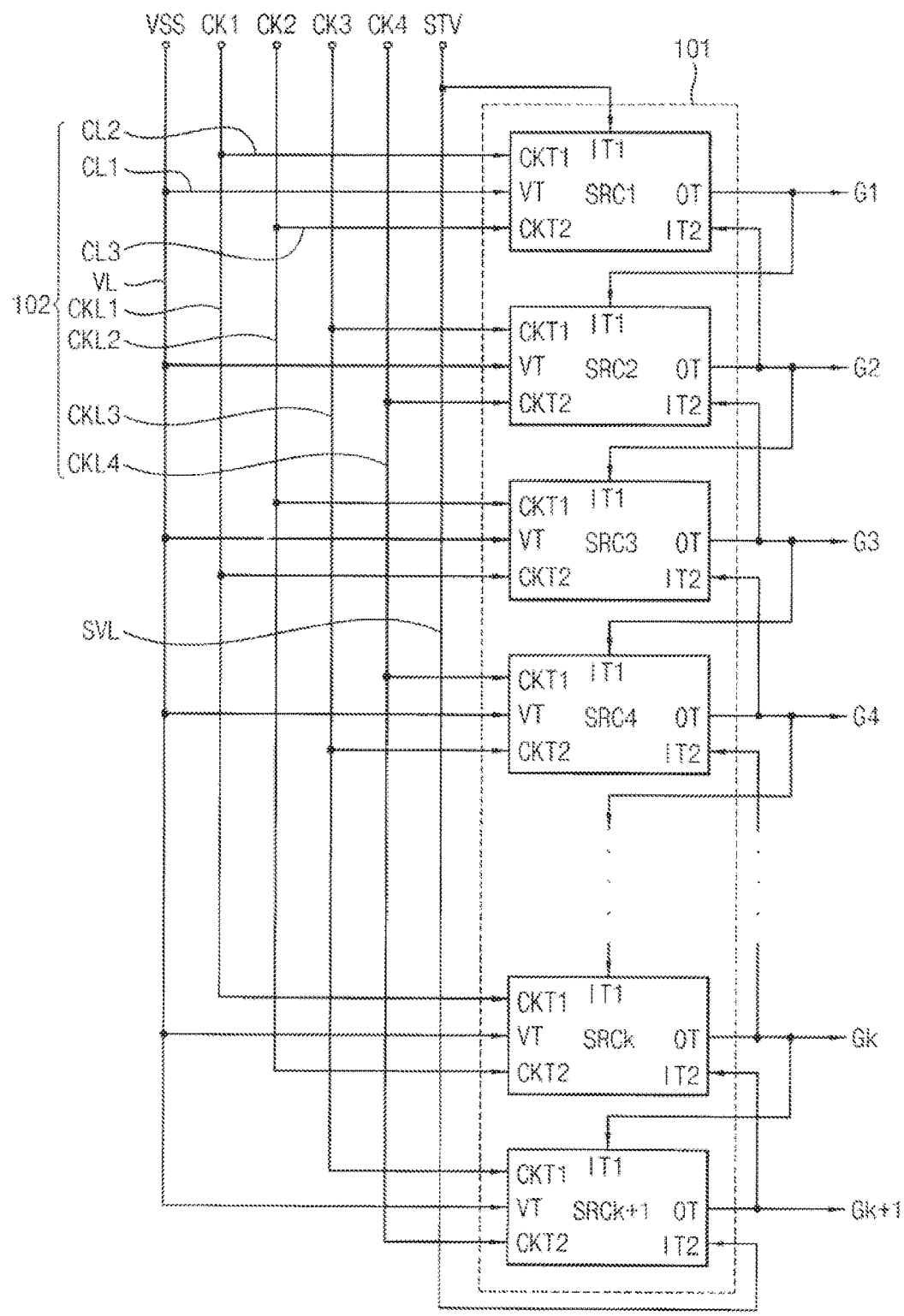
FIG. 2 is a schematic diagram illustrating one embodiment for the gate driving circuitry and associated wirings of a gate driving part of FIG. 1.
Figure 3:
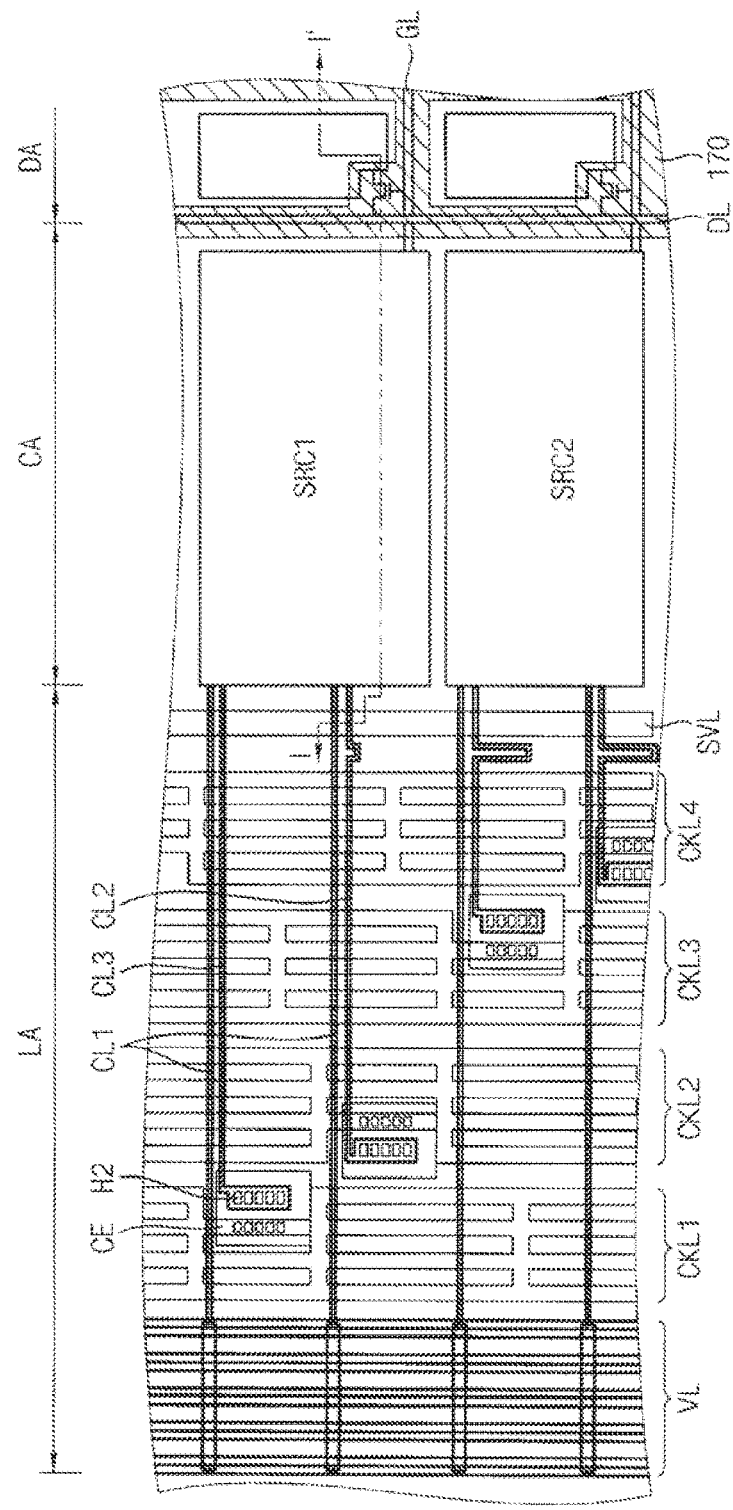
FIG. 3 is a diagram illustrating a enlarged portion "A" of FIG. 1 that includes gate driving circuitry and associated wirings.

FIG. 2 is a block diagram illustrating a gate driving part 101/102 of FIG. 1. FIG. 3 is an enlarged diagram illustrating a portion "A" (at the top of area PA1) of FIG. 1.

Referring to FIGS. 1, 2 and 3, one of the first and second integrated gate driving circuits 103 and 104 includes a circuit part 101 and a wiring part 102 as already explained.

The circuit part 101 is disposed in the circuit sub-area CA and includes a shift register formed of a plurality of shift stages SRC1, SRC2, . . . , SRCk+1 that are connected one to another, wherein 'k' is a natural number. The first to k-th stages SRC1, SRC2, . . . , SRCk are electrically connected to corresponding first to k-th gate wirings GL1, . . . , GLk. The first to k-th stages SRC1, SRC2, . . . , SRCk sequentially output corresponding first to k-th gate activating signals G1, G2, . . . , Gk. The (k+1)-th stage SRCk+1 is electrically floated from the gate wiring and is used to control an operation of the k-th stage SRCk.

For example, an n-th stage SRCn includes a first input terminal IT1, a second input terminal IT2, a voltage terminal VT, a first clock terminal CKT1, a second clock terminal CKT2 and an output terminal OT, wherein, 'n' is a natural number not greater than 'k+1'. The first input terminal IT1 receives a start control signal. The start control signal may be a vertical synchronization start signal (STV) or an activating gate signal (G1, G2, etc.) output from a previous stage. The second input terminal IT2 receives a stop control signal. The stop control signal may be the vertical start signal of a following frame or an activating gate signal (G2, G3, etc.) output from a following stage. The voltage terminal VT receives a gate turn-off voltage level, VSS. The first clock terminal CKT1 receives a first clock signal CK1, and the second clock terminal CKT2 receives a second clock signal CK2 that is different from the first clock signal CK1. The output terminal OT outputs a gate signal to be electrically connected to the corresponding n-th gate wiring GLn.

The wiring part 102 is disposed on the wiring sub-area LA to include a plurality of signal wirings delivering a plurality of driving signals and a plurality of connection wirings (cross links or "CL" segments) connecting the signal wirings and terminals of the stage. The signal wirings are extended in a first direction, and the connection wirings (CLs) are extended in a second direction crossing the first direction. For example, the signals wirings and the connection wirings may be formed in different metal layers that are insulatively separated from one another.

For example, the wiring part 102 includes a voltage wiring VL delivering a gate off voltage (VSS), a first clock wiring CKL1 delivering a first clock signal (CK1), a second clock wiring CKL2 delivering a second clock signal (CK2), a third clock wiring CKL3 delivering a third clock signal (CK3), a fourth clock wiring CKL4 delivering a fourth clock signal (CK4) and a start wiring SVL delivering a vertical start signal (STV). For example, the first and second clock wirings CKL1 and CKL2 may be electrically connected to odd-numbered stages, and the third and fourth clock wirings CKL3 and CKL4 may be electrically connected to even-numbered stages.

Moreover, the wiring part 102 further includes a first cross-link connection wiring CL1, a second connection wiring CL2 and a third connection wiring CL3. The first connection wiring CL1 connects the voltage wiring VL and a voltage terminal VT of the adjacent and corresponding shift register stage. The second connection wiring CL2 connects one of the first and second clock wirings CKL1 and CKL2 and a first clock terminal CKT1 of the stage. The third connection wiring CL3 connects one of the first and second clock wirings CKL1 and CKL2 and a second clock terminal CKT2 of the stage. The voltage wiring VL is formed in a first metal layer (metal-1), and the first and second clock wirings CKL1 and CKL2 and the start wiring SVL are formed in a second metal layer (metal-2) different from the first metal layer. In this case, an insulation layer is disposed between the first metal layer and the second metal layer, so that the first metal layer is electrically isolated from the second metal layer where it needs to be so isolated. Alternatively, the voltage wiring VL may be formed in the second metal layer. In this exemplary embodiment, the number of clock wirings is four, however, the number of clock wirings may be designed in various manners such as two, four, etc.

The first to third cross-link connection wirings CL1, CL2 and CL3 are extended to cross with the signal wirings VSS, CKL1, CKL2, CKL3, CKL4 and SVL. Thus, a crossing area on which the first to third connection wirings CL1, CL2 and CL3 and the signal wirings VSS, CKL1, CKL2, CKL3, CKL4 and SVL are crossed may be formed.

Like the VL lines, the first to third connection wirings CL1, CL2 and CL3 are formed in the first metal layer. Thus, in the crossing area, the first and second clock wirings CKL1 and CKL2 and the start wiring SVL, which are formed from the second metal layer, are electrically isolated from the first to third connection wirings CL1, CL2 and CL3, which are formed from the first metal layer, by the insulation layer disposed between the first metal layer and the second metal layer.

Figure 4:
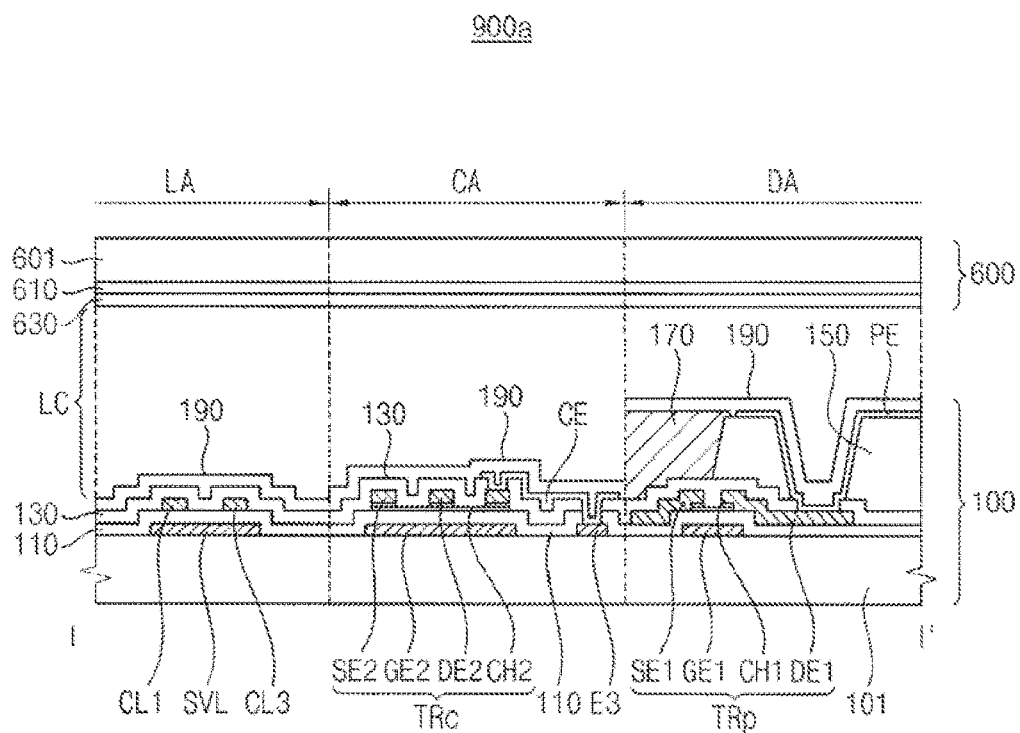
FIG. 4 is a cross-sectional view taken along a line I-I' of FIG. 3.

FIG. 4 is a cross-sectional view taken along a line I-I' of FIG. 3.

Referring to FIGS. 3 and 4, the display device 900a includes a display substrate 100, an opposite substrate 600 facing the display substrate 100, and a liquid crystal layer LC disposed between the display substrate 100 and the opposite substrate 600.

The display substrate 100 includes a first base substrate 101 (e.g., transparent glass).

A pixel transistor TRp, a color filter 150, a pixel electrode PE, a light-blocking layer 170 and a first alignment layer 190 are formed on the display area DA of the first base substrate 101. The pixel transistor TRp includes a first electrode formed from a first metal layer and a second electrode formed from a second metal layer.

For example, the pixel transistor TRp includes a first gate electrode GE1 formed from the first metal layer, a first channel portion CH1 disposed on the first gate electrode GE1, an insulation layer 110 disposed between the first gate electrode GE1 and the first channel portion CH1, a first source electrode SE1 disposed on the first channel portion CH1 and a first drain electrode DE1 disposed on the first channel portion CH1. The first gate electrode GE1 is electrically connected to the gate wiring GL, and the first source electrode SE1 is electrically connected to the data wiring DL.

A protection layer 130 is disposed on and sealingly makes direct contact with the first base substrate 101 on which the pixel transistor TRp is disposed. Since the protection layer 130 also directly contacts to and extends continuously over the first source electrode SE1 and the first drain electrode DE1, the protection layer 130 provides a first layer of protection for protecting the source and drain electrodes, SE1 and DE1, from being exposed to chemically corrosive agents.

The color filter 150 is disposed on the protection layer in correspondence with a pixel area.

The pixel electrode PE is disposed on the color filter 150 in correspondence with the pixel area. The pixel electrode PE contacts to the first drain electrode DE1 through a contact hole formed through the protection layer 130, so that the pixel electrode PE electrically connects to the pixel transistor TRp.

A light-blocking layer 170 (black matrix) is disposed at a peripheral portion of the pixel electrode to block light. For example, the light-blocking layer 170 is disposed on the protection layer 130 in correspondence with an area where the pixel transistor TRp is disposed. The light-blocking layer 170 may be disposed on the protection layer 130 in correspondence with an area where the data wirings DL and the gate wirings GL are formed. Alternatively, the light-blocking layer 170 may be formed on the display area DA in a lattice or matrix pattern.

The first alignment layer 190 is disposed on the light-blocking layer 170 and the pixel electrode PE. The first alignment layer 190 is formed on the display area DA and functions to initially align liquid crystal molecules of the liquid crystal layer LC when no electric field is present.

In accordance with the disclosure, the first alignment layer 190 is extended out to cover the register stage circuitry (e.g., SRC1) and the cross-link wirings such that the first alignment layer 190 is formed in the gate drive circuit sub-area CA and the links sub-area LA of the first base substrate 101. Thus, in addition to providing a LC alignment function in the display area DA, the extended first alignment layer 190 also serves as a buffer layer for protecting the register stage circuitry (e.g., SRC1) and the cross-link wirings.

The illustrated register stage circuitry (e.g., SRC1) of FIG. 4 includes one or more inter-connection electrodes CE structured and patterned to electrically connect the register circuit transistors TRc with each other. The circuit transistors TRc each include a first electrode formed from a first metal layer and a second electrode formed from a second metal layer. For example, the circuit transistor TRc includes a second gate electrode GE2 formed from the first metal layer, a second channel portion CH2 disposed on the second gate electrode GE2, an insulation layer 110 disposed between the second gate electrode GE2 and the second channel portion CH2, a second source electrode SE2 disposed on the second channel portion CH2 and a second drain electrode DE2. The protection layer 130 and the first alignment layer 190 both extend to be formed over the circuit transistors TRc and thus protectively encapsulating the register circuit including its transistors TRc.

The connection electrodes CE and the pixel electrodes PE may be formed from an identical conductive layer where the latter is made of a light passing material (e.g., ITO, IZO). The connection electrode CE electrically connects a first electrode E3 formed from the first metal layer and a second electrode (i.e., a second source electrode SE2) formed from the second metal layer through a second contact hole H2 formed through the insulation layer 110 (inter-metal dielectric layer) and the protection layer 130.

As mentioned, the first alignment layer 190 extends to be substantially continuously formed on the circuit sub-area CA and to make direct contact with the protection layer 130 and the connection electrode CE. The first alignment layer 190 may thus serve as a supplemental protective covering for the CE electrodes and may prevent liquid crystal material from infiltrating into corrosion sensitive parts of the register stage circuitry (e.g., SRC1).

As also mentioned above, the crosslinks wiring sub-area LA includes first wirings formed from the first metal layer, the inter-metal insulation layer 110, second wirings formed from the second metal layer, the protection layer 130 and the first alignment layer 190. Accordingly, the material of the outwardly extended alignment layer 190 serves as a protective buffer layer for protecting the protection layer 130.

For example, the signal wirings VSS, CKL1, CKL2, CKL3, CKL4 and SVL, the crosslink connection wirings CL1, CL2 and CL3, the protection layer 130 and the first alignment layer 190 are formed on the crosslinks wiring sub-area LA.

The voltage wiring VL, first clock wiring CKL1, second clock wiring CKL2 and frame start wiring SVL are extended in the first direction. The voltage wiring VL is formed from material of the first metal layer, and the first and second clock wirings CKL1 and CKL2 and the start wiring SVL are formed from material of the second metal layer.

The crosslink connection wirings CL1, CL2 and CL3 are extended in a second direction crossing the first direction to be formed in the first metal layer. The connection wirings CL1, CL2 and CL3 cross the first and second clock wirings CKL1 and CKL2 and the start wiring SVL that are formed from the second metal layer. The inter-metal insulation layer 110 is disposed between the first metal layer and the second metal layer.

The protection layer 130 extends to where the inter-metal insulation layer 110 sealingly makes direct contact with the first base substrate 101 and thus the protection layer 130, together with the first base substrate 101 function to sealingly encapsulate the connection wirings CL1, CL2 and CL3.

The alignment layer 190 is formed on the protection layer 130 to make direct contact with the protection layer 130. The alignment layer 190 thus serves as an additional protective layer that can help prevent cracks from being formed through the protection layer 130 or at least help to prevent liquid crystal material from infiltrating into such cracks.

In one embodiment, the first alignment layer 190 is formed from at least one polymer material (e.g., an organic polymer) that is different from the materials used to form the inter-metal insulation layer 110 and the protection layer 130. The polymer material(s) of the first alignment layer 190 can be resistive to various corrosive agents other than those resisted by the insulation layer 110 and the protection layer 130, so that the first alignment layer 190 may thus protect the insulation layer 110 and the protection layer 130 from such various corrosive agents. Additionally, the first alignment layer 190 may have a tensile flexibility or resiliency that is more forgiving to thermal expansion mechanisms than those of the insulation layer 110 and the protection layer 130.

When the display device is driven at or to a high temperature and has high voltages developed within, stress and strain may develop within the protection layer 130 and the insulation layer 110 due for example to differences of thermal expansion coefficients between the wirings and protection layer 130, so that crack formation through the protection layer 130 and the insulation layer 110 may not be fully prevented. However, since the polymer material of the first alignment layer 190 can have greater resilience or flexibility than the materials of the protection layer 130 and the insulation layer 110, the first alignment layer 190 has the quality that it is excellent in preventing or at least covering up and thus curing crack formation. Even if a crack is generated through the protection layer 130, the more flexible first alignment layer 190 may nonetheless prevent the surrounding liquid crystal molecules from infiltrating into metal layer wirings through the crack and corrosively attacking these metal wirings. Moreover, the first alignment layer 190 may prevent the protection layer 130 that in one embodiment, is an inorganic insulation material from being damaged by a washing process and so one where the latter occurs during mass production. Furthermore, the first alignment layer 190 may prevent the protection layer 130 and the insulation layer 110 from being damaged by an external static electricity discharge.

The opposite substrate 600 includes a second base substrate 601, a common electrode 610 and a second alignment layer 630. The common electrode 610 is disposed on the second base substrate 601. The second alignment layer 630 is disposed on the common electrode 610 to initially align liquid crystal molecules.

Figure 5A:
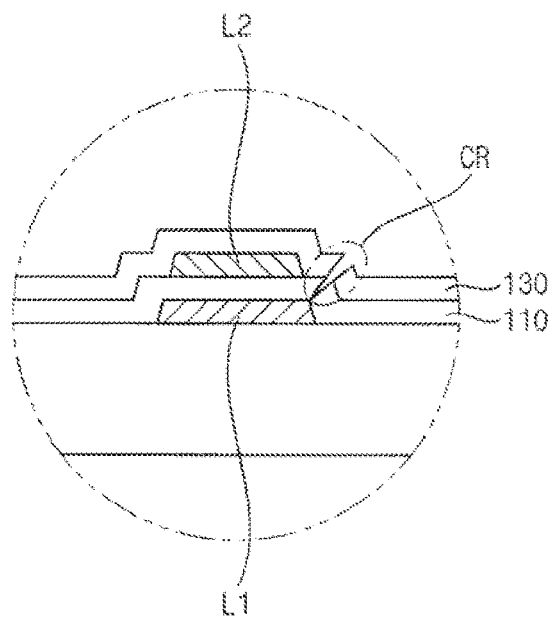
FIGS. 5A and 5B are schematic comparison diagrams for showing how a defect preventing mechanism of FIG. 4 can operate.
Figure 5B:
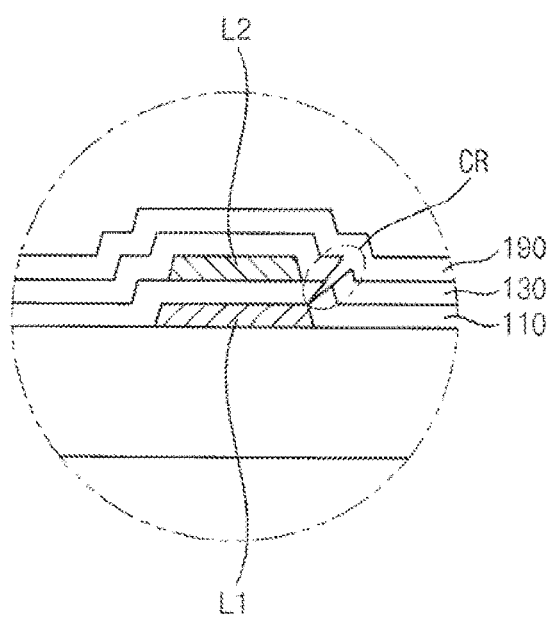

FIGS. 5A and 5B are comparative schematic diagrams for showing how a defect preventing mechanism may operate for the wiring part of FIG. 4.

Referring to FIG. 5A, a display substrate not having layer 190 in accordance with a comparative embodiment includes a first wiring L1 formed from a first metal layer, an insulation layer 110 formed on the first wiring L1, a second wiring L2 formed from a second metal layer to be disposed on the insulation layer 110, and only a protection layer 130 formed on the second wiring L2.

When the first and second wirings L1 and L2 of the comparative embodiment are driven at high temperatures and high voltages, stress is increased at cross-sections of the first and second wirings L1 and L2 due to, for example, a difference of thermal expansion coefficients among the first and second wirings L1 and L2, the insulation layer 110 and the protection layer 130 in a crossing area of the first and second wirings L1 and L2, so that a stress-induced crack CR may be generated through the protection layer 130.

Liquid crystal molecules that escape the display area may then infiltrate into the first wiring L1 through the crack CR, so that defects such as open wiring defects, burnt-out wirings phenomenon, etc., are generated.

Referring however to FIG. 5B, a display device according to an exemplary embodiment includes a first wiring L1 formed from a first metal layer, an insulation layer 110 formed on the first wiring L1, a second wiring L2 formed from a second metal layer to be formed on the insulation layer 110, a protection layer 130 formed on the second wiring L2, and an alignment layer 190 formed on the protection layer 130.

In this case (5B), even though a stress induced crack CR might be generated through the protection layer 130 for example in a nonplanar region of 130, the alignment layer 190 may nonetheless prevent surrounding liquid crystal molecules from infiltrating into a metal wiring through the crack CR. Moreover, the alignment layer 190 has the quality which is excellent in the crack prevention, so that defects due to the crack may be prevented. Moreover, the alignment layer 190 may prevent the protection layer 130 that is an inorganic insulation material from being damaged by a washing or other cleaning process and so one. Furthermore, the alignment layer 190 may prevent the protection layer 130 and the insulation layer 110 from being damaged by an external static electricity discharge.

FIGS. 6A, 6B, 6C and 6D are cross-sectional views showing a method of manufacturing the display device of FIG. 4.

Figure 6A:
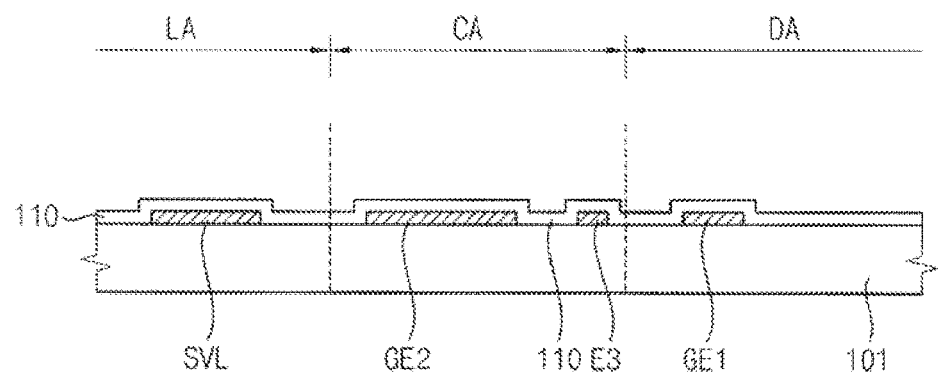
FIGS. 6A, 6B, 6C and 6D are cross-sectional views showing a method of manufacturing the display device of FIG. 4.

Referring to FIGS. 3, 4 and 6A, in a first mass production step, a first metal layer is formed on a first base substrate 101, and then the first metal layer is patterned to form a first metal pattern on the first base substrate 101. The first metal pattern includes the gate wirings GL and first gate electrodes GE1 of corresponding pixel transistors TRp that are formed in the display area DA. The first metal pattern further includes the second gate electrodes GE2 of respective register circuit transistors TRc formed in the circuit sub-area CA. The first metal pattern further includes the voltage wiring VL formed in the wiring sub-area LA, and the plurality of cross-connection wirings CL1, CL2 and CL3 formed in the wiring sub-area LA.

Still in FIG. 6A, an insulation layer 110 is next formed on the first base substrate 101 on which the first metal pattern has been formed to thereby cover the first metal pattern. The insulation layer 110 may include an inorganic insulation material such as a silicon oxide (SiOx), a silicon nitride (SiNx) or a silicon oxynitride (SiNxOy).

Figure 6B:
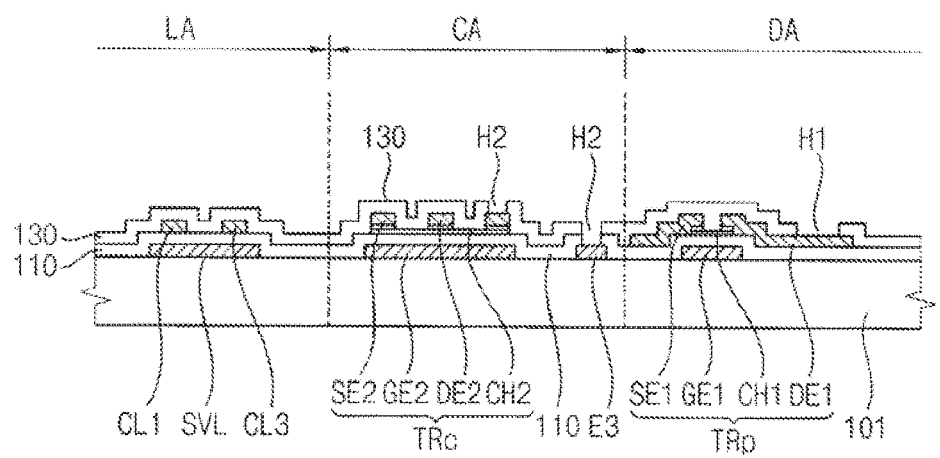

Referring to FIGS. 3, 4 and 6B, next, a semiconductive channel layer is formed on the first base substrate 101 on which the insulation layer 110 is formed. The channel layer is patterned to form a channel pattern on the first base substrate 101. The channel pattern includes first channel portions CH1 of respective pixel transistors TRp formed in the display area DA and second channel portions CH2 of respective register circuit transistors TRc formed in the circuit sub-area CA.

Next, a second metal layer is formed on the first base substrate 101 on which the channel pattern is formed, and then the second metal layer is patterned to form a second metal pattern on the first base substrate 101.

The second metal pattern includes the data wirings DL and the first source electrodes SE1 and first drain electrodes DE1 of the respective pixel transistors TRp that are formed in the display area DA. In addition, the second metal pattern includes the second source electrodes SE2 and second drain electrodes DE2 of the drive circuit transistors TRc that are formed in the circuit sub-area CA. In addition, the second metal pattern includes the first clock wiring CKL1, second clock wiring CKL2, third clock wiring CKL3, fourth clock wiring CKL4 lines and the start-of-frame wiring SVL that are formed in the wiring sub-area LA.

The protection layer 130 is next formed on the first base substrate 101 on which the second metal pattern is formed as so to cover the second metal pattern. The protection layer 130 may include an inorganic insulation material such as a silicon oxide (SiOx) or a silicon nitride (SiNx) or a silicon oxynitride (SiNxOy).

A first contact hole H1 is formed through the protection layer 130 corresponding to the display area DA, for example through an etching process, and then a second contact hole H2 is formed through the protection layer 130 corresponding to the circuit sub-area CA and the wiring sub-area LA.

Figure 6C:
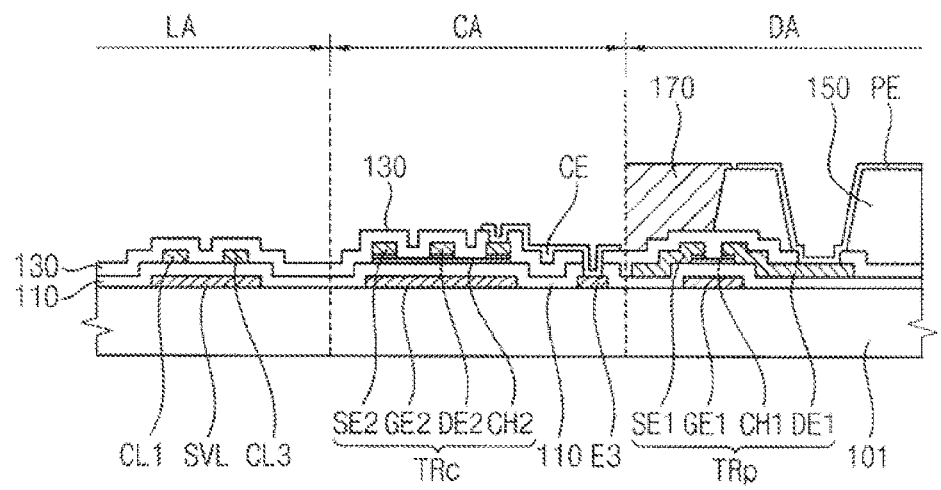

Referring to FIGS. 3, 4 and 6C, next, a color-dyed (or clear if a white pixel) photoresist material is formed on the protection layer 130 through which the first and second contact holes H1 and H2 are formed, and then the photoresist material is patterned to form respective color filters 150 in corresponding pixel areas. The color filters 150 may include a red color filter, a green color filter, a blue color filter, etc.

A transparent conductive layer is next formed on the first base substrate 101 on which the color filter 150 is formed, and then the transparent conductive layer is patterned to form a transparent electrode pattern. The transparent conductive layer may be composed of ITO, IZO, etc.

The transparent electrode pattern includes a plurality of pixel electrodes PE formed in the pixel area DA, and a plurality of cross-connection electrodes CE formed in the circuit sub-area CA and in the wiring sub-area LA. The pixel electrodes PE may be disposed on the color filters 150.

A light-blocking material is next formed on the first base substrate 101 on which the transparent electrode pattern is formed, and then the light-blocking material is patterned to form a light-blocking layer 170 on the display area DA. The light-blocking layer 170 may be formed in accordance with areas where the data wirings DL, the gate wirings GL and the pixel transistors TRp are formed so as to thereby prevent light from leaking through in those non-image creating areas.

Figure 6D:
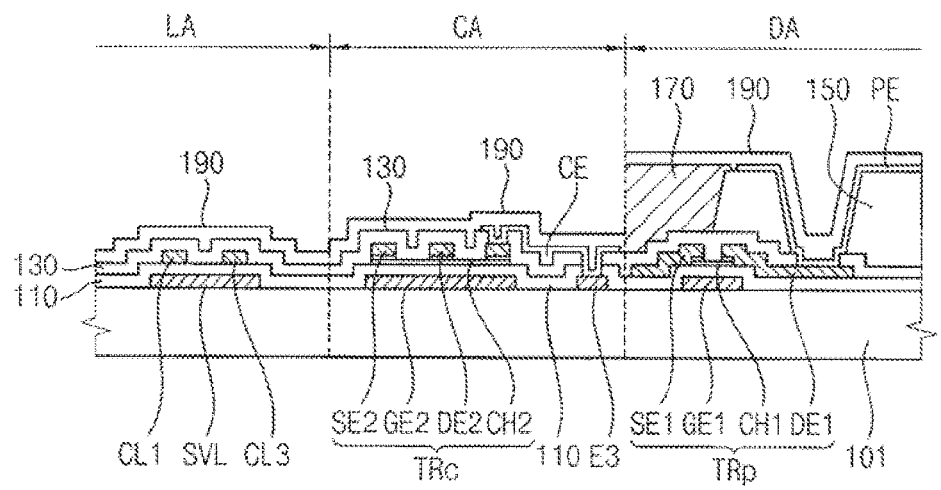

Referring to FIGS. 3, 4 and 6D, next, the first alignment layer 190 is formed on the first base substrate 101 on which the light-blocking layer 170 is formed.

The first alignment layer 190 is formed in the display area DA, and is continued over the circuit sub-area CA and the links wiring sub-area LA. The first alignment layer 190 formed on the circuit sub-area CA and the wiring sub-area LA is formed on the protection layer 130 to make direct contact with the protection layer 130 and the connection electrodes CE. The first alignment layer 190 may protect the protection layer 130 and the insulation layer 110 that are formed on the circuit sub-area CA and the wiring sub-area LA. The first alignment layer 190 may prevent the protection layer 130 and the insulation layer 110, which are formed at a crossing area of the wirings in the wiring sub-area LA, from being damaged due to formed cracks. In addition, the first alignment layer 190 may prevent circuit impeding defects from being generated due to crack formation.

Thus, operational reliability of the gate driving part integrally formed on the display substrate 100 may be improved.

A manufacturing process sequence of the display substrate 100 according to Embodiment 1 is not limited to a process sequence as described in FIGS. 6A to 6D, and the process sequence may be varied in a variety of manners.

Hereinafter, same reference numerals will be generally used to designate same or similar components as those described in the previous embodiment, and thus any repetitive detailed explanation thereof will be omitted or simplified.

Figure 7:
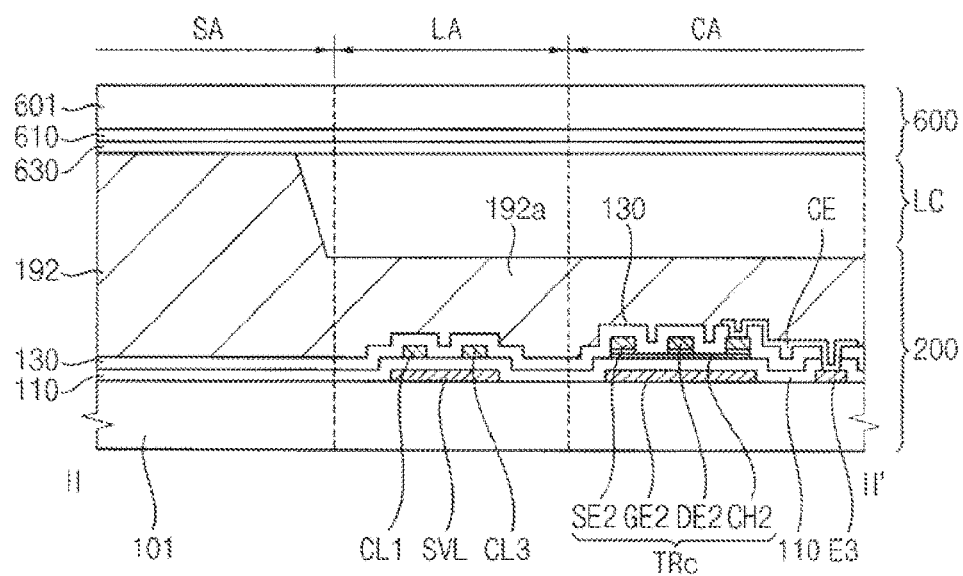
FIG. 7 is a cross-sectional view of a display device according to another exemplary embodiment of the present invention.
Figure 8A:
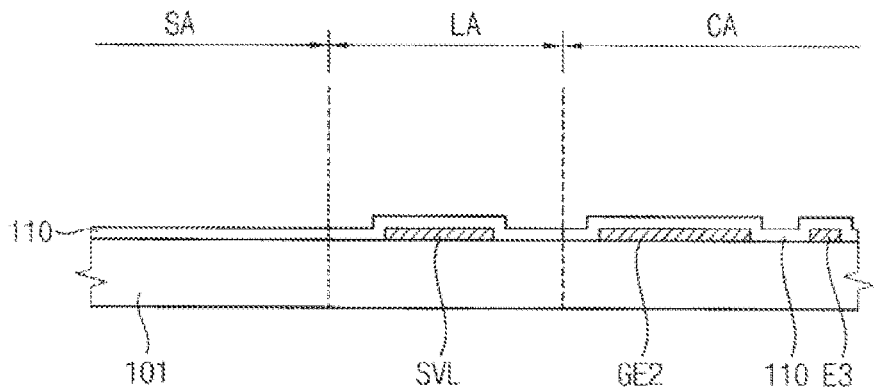
FIGS. 8A, 8B, 8C and 8D are cross-sectional views showing a method of manufacturing the display device of FIG. 7.
Figure 8B:
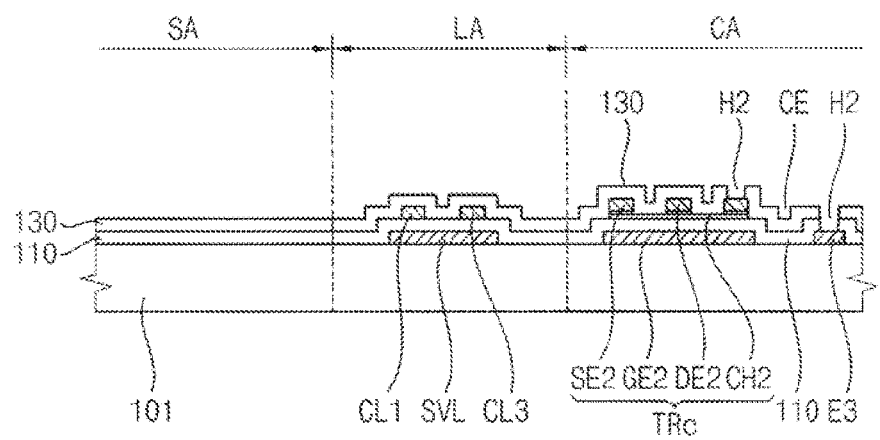
Figure 8C:
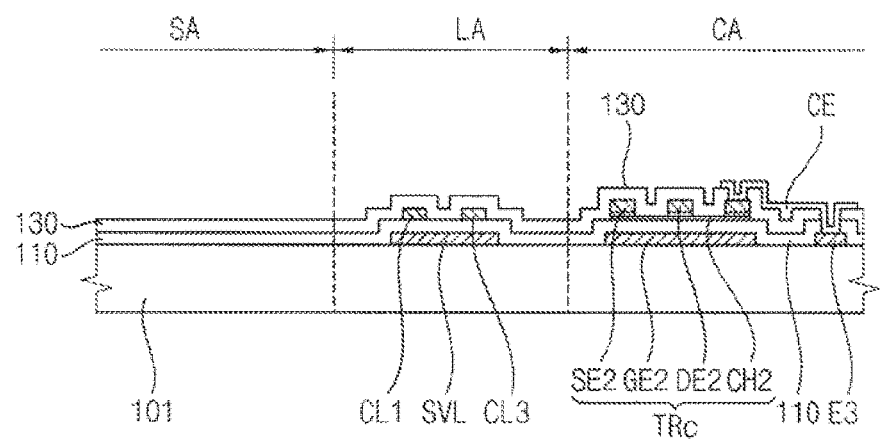
Figure 8D:
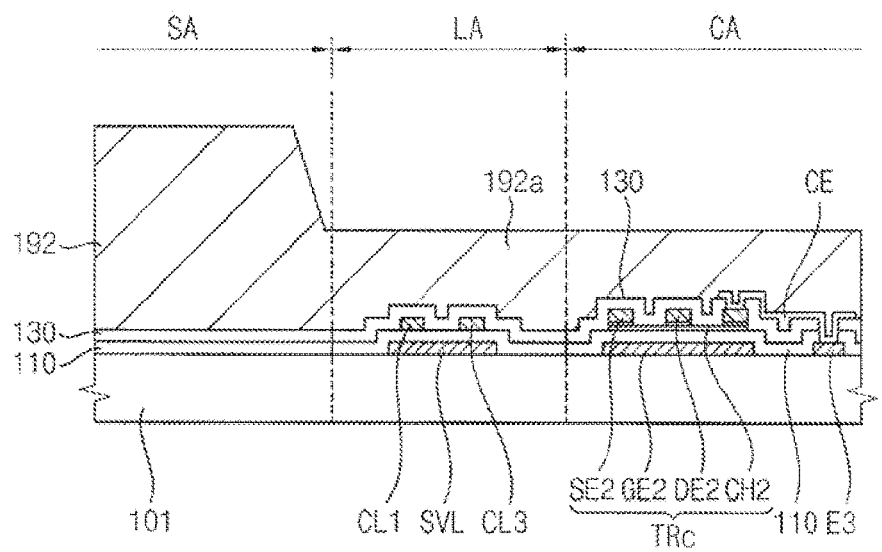

FIG. 7 is a cross-sectional view of a display device according to another exemplary embodiment.

Referring to FIGS. 1, 4 and 7, the display device 900b includes a display substrate 200, an opposite substrate 600 facing the display substrate 200, and a liquid crystal layer LC disposed between the display substrate 200 and the opposite substrate 600.

The display substrate 400 includes a first base substrate 101. The first base substrate 101 includes a sealing-crossing sub-area SA adjacent to the wiring sub-area LA. A sealing layer 192' is disposed on the sealing-crossing area SA to combine with the display substrate 200 and the opposite substrate 600.

A pixel transistor TRp, a color filter 150, a pixel electrode PE, a light-blocking layer 170 and a first alignment layer 190 are formed on the display area DA of the first base substrate 101. A protection layer 130 is disposed on the first base substrate 101 in which the pixel transistor TRp is disposed.

The color filter 150 is disposed on the protection layer 130 in correspondence with a pixel area.

The pixel electrode PE is disposed on the color filter 150 in correspondence with the pixel area. The pixel electrode PE contacts to the first drain electrode DE1 through a contact hole formed through the protection layer 130, so that the pixel electrode PE electrically connects with the pixel transistor TRp.

The light-blocking layer 170 is disposed on the protection layer 130 in correspondence with an area where the pixel transistor TRp is positioned (see FIG. 6D). The light-blocking layer 170 may be disposed on the protection layer 130 in correspondence with an area where the data wiring DL and the gate wiring GL are formed. Alternatively, the light-blocking layer 170 may be formed on the display area DA in correspondence with a plurality of pixel electrodes in a lattice pattern.

The first alignment layer 190 (see again FIG. 6D) is disposed on the light-blocking layer 170 and the pixel electrode PE. The first alignment layer 190 formed on the display area DA initially aligns liquid crystal molecules of the liquid crystal layer LC.

The register stage circuitry (e.g., SRC1), the protection layer 130 and an extended dummy sealing layer 192a are disposed in the circuit sub-area CA of the first base substrate 101. As shown, the extended dummy sealing layer 192a extends continuously from the actual sealing structure 192' but the dummy sealing layer 192a does not seal in the overlying liquid crystal material LC. Instead the dummy sealing layer 192a functions as a supplemental buffer layer that supplements protection layer 130 in the function of protecting the underlying drive circuit stage (e.g., SRC1).

The drive circuit stage (e.g., SRC1) includes a connection electrode CE electrically connecting the circuit transistors TRc with each other. The circuit transistor TRc includes a second gate electrode GE2 formed from the first metal layer, a second channel portion CH2 disposed on the second gate electrode GE2, an insulation layer 110 disposed between the second gate electrode GE2 and the second channel portion CH2, a second source electrode SE2 disposed on the second channel portion CH2 and a second drain electrode DE2.

The protection layer 130 makes direct contact with the drive circuit transistors TRc to thus protectively cover the circuit transistors TRc. The protection layer 192a makes direct contact with the protection layer 130 to thus protectively cover the protection layer 130 (and the CE electrodes).

The dummy sealing layer 192a includes a polymer material to be disposed on the protection layer 130, so that the dummy sealing layer 192a makes direct contact with the protection layer 130. An upper surface of the dummy sealing layer 192a is spaced apart from the opposite substrate 600 by a predetermined interval. For example, the dummy sealing layer 192a is not attached to the opposite substrate 600, and the dummy sealing layer 192a makes direct contact with the protection layer 130 and the connection electrode CE to thus protect the stage SRC1.

The signal wirings VSS, CKL1, CKL2, CKL3, CKL4 and SVL, the connection wirings CL1, CL2 and CL3, the protection layer 130 and the dummy sealing layer 192a are formed on the wiring sub-area LA of the first base substrate 101. The dummy sealing layer 192a is a buffer layer for protecting the protection layer 130.

The voltage wiring VL, a first clock wiring CKL1, a second clock wiring CKL2 and a start wiring SVL are extended in the first direction. The voltage wiring VL is formed from the first metal layer, and the first and second clock wirings CKL1 and CKL2 and the start wiring SVL are formed from the second metal layer.

The connection wirings CL1, CL2 and CL3 are extended in a second direction crossing the first direction to be formed from the first metal layer. The connection wirings CL1, CL2 and CL3 cross the first and second clock wirings CKL1 and CKL2 and the start wiring SVL that are formed from the second metal layer. The insulation layer 110 is disposed between the first metal layer and the second metal layer.

The protection layer 130 is formed on the first base substrate 101 on which the connection wirings CL1, CL2 and CL3 are formed.

The dummy sealing layer 192a includes a polymer material to be disposed on the protection layer 130, so that the dummy sealing layer 192a makes direct contact with the protection layer 130. For example, the dummy sealing layer 192a may protect the protection layer 130 and the insulation layer 110.

When the display device is driven at or to high temperatures and develops high voltages within, stresses and strains may be applied to the protection layer 130 and the insulation layer 110 due to difference of thermal expansion coefficients between the wirings and protection layer 130, so that formation of a crack into the protection layer 130 and the insulation layer 110 can occur. However, because the polymer material of dummy sealing layer 192a has greater flexibility and/or resiliency, it has the quality of providing excellent through-crack prevention. Even when a nascent crack is generated in the protection layer 130, the dummy sealing layer 192a may prevent liquid crystal molecules from infiltrating into a metal wiring through the nascent crack. Moreover, the dummy sealing layer 192a may prevent the protection layer 130 that is an inorganic insulation material from being damaged by corrosive agents such as in a mass production washing or other cleaning process and so one. Furthermore, the dummy sealing layer 192a may prevent the protection layer 130 and the insulation layer 110 from being damaged by an external static electricity discharge.

The first insulation layer 110, the protection layer 130 and the sealing layer 192 are sequentially formed on the sealing area SA of the first base substrate 101.

The sealing layer 192 may include a material identical as the dummy sealing layer 192a. The sealing layer 192 is attached at the display substrate 200 and the opposite substrate 600 to seal the liquid crystal layer LC.

The opposite substrate 600 includes a second base substrate 601, a common electrode 610 and a second alignment layer 630. The common electrode 610 is disposed on the second base substrate 601. The second alignment layer 630 is disposed on the common electrode 610 to initially align the liquid crystal.

According to the present embodiment, a damage of the connection electrode CE formed on the circuit sub-area CA and the wiring sub-area LA may be prevented. In a conventional art that the sealing layer 192 is extended to the circuit sub-area CA and the wiring sub-area LA, defects in which the sealing layer 192 is disattached from the substrates 200 and 600 may be generated when the sealing layer 192 is expanding due to an infiltrating of moistures. In this case, the connection electrode CE formed on the circuit sub-area CA and the wiring sub-area LA together with the sealing layer 192 may be disattached from the substrates 200 and 600. However, the dummy sealing layer 192a having a thinner thickness is formed on the circuit sub-area CA and the wiring sub-area LA, so that an expanded space is sufficient even though the dummy sealing layer 192a is partially expanded due to an infiltration of moisture. Thus, defects in which the sealing layer 192 is partially disattached from the substrate 300 do not become fatal ones because the dummy sealing layer 192a provides supplemental protection. Therefore, it may prevent the connection electrode CE from being damaged by infiltrating moisture or the like.

FIGS. 8A, 8B, 8C and 8D are cross-sectional views showing a method of manufacturing the display device of FIG. 7.

Referring to FIGS. 3, 4, 7 and 8A, a first metal layer is formed on a first base substrate 101, and then the first metal layer is patterned to form a first metal pattern on the first base substrate 101. The first metal pattern includes a gate wiring GL and a first gate electrode GE1 of a pixel transistor TRp that are formed in the display area DA, a second gate electrode GE2 of a circuit transistor TRc formed in the circuit sub-area CA, a voltage wiring VL formed in the wiring sub-area LA, and a plurality of connection wirings CL1, CL2 and CL3 formed in the wiring sub-area LA.

An insulation layer 110 is formed on the first base substrate 101 on which the first metal pattern is formed to cover the first metal pattern. The insulation layer 110 may include an inorganic insulation material such as a silicon oxide (SiOx) or a silicon nitride (SiNx).

Referring to FIGS. 3, 4, 7 and 8B, a channel layer is formed on the first base substrate 101 on which the insulation layer 110 is formed, and then the channel layer is patterned to form a channel pattern on the first base substrate 101. The channel pattern includes a first channel portion CH1 of the pixel transistor TRp formed in the display area DA, and a second channel portion CH2 of the circuit transistor TRc formed in the circuit sub-area CA.

A second metal layer is formed on the first base substrate 101 on which the channel pattern is formed, and then the second metal payer is patterned to form a second metal pattern on the first base substrate 101.

The second metal pattern includes a data wiring DL and a first source electrode SE1 and a first drain electrode DE1 of the pixel transistor TRp that are formed in the display area DA. In addition, the second metal pattern includes a second source electrode SE2 and a second drain electrode DE2 of the circuit transistor TRc that are formed in the circuit sub-area CA. In addition, the second metal pattern includes a first clock wiring CKL1, a second clock wiring CKL2, a third clock wiring CKL3, a fourth clock wiring CKL4 and a starting wiring SVL that are formed in the wiring sub-area LA.

A protection layer 130 is formed on the first base substrate 101 on which the second metal pattern is formed so as to cover the second metal pattern. The protection layer 130 may include an inorganic insulation material such as a silicon oxide (SiOx) or a silicon nitride (SiNx).

A first contact hole H1 is formed through the protection layer 130 corresponding to the display area DA through an etching process, and then a second contact hole H2 is formed through the protection layer 130 corresponding to the circuit sub-area CA and the wiring sub-area LA.

Referring to FIGS. 3, 4, 7 and 8C, a color-dyed photoresist material (PR) is formed on the protection layer 130 through which the first and second contact holes H1 and H2 are formed, and then the PR material is patterned to form a color filter 150 on a pixel area. The color filter may include a red color filter, a green color filter, a blue color filter, etc.

A transparent conductive layer is formed on the first base substrate 101 on which the color filter 150 is formed, and then the transparent conductive layer is patterned to form a transparent electrode pattern.

The transparent electrode pattern includes a pixel electrode PE formed in the pixel area DA and a connection electrode CE that are formed in the circuit sub-area CA and the wiring sub-area LA. The pixel electrode PE is disposed on the color filter 150.

A light-blocking material is formed in the first base substrate 101 on which the transparent electrode pattern is formed, and then the light-blocking material is patterned to form a light-blocking layer 170 on the display area DA. The light-blocking layer 170 may be formed in accordance with areas where the data wirings DL, the gate wirings GL and the pixel transistors TRp are formed.

A first alignment layer 190 is formed on the first base substrate 101 on which the light-blocking layer 170 is formed. The first alignment layer 190 is formed in the display area DA. The first alignment layer 190 is not formed in the circuit sub-area CA, the wiring sub-area LA and the sealing area SA. Alternatively, the first alignment layer 190 may be extended to the circuit sub-area CA, the wiring sub-area LA or the sealing area SA.

Referring to FIGS. 3, 4, 7 and 8D, a sealing material is formed on the first base substrate 101 on which the first alignment layer 190 is formed.

The sealing material may include a polymer material. The sealing material includes a dummy sealing layer portion 192a extended from the actual seal 192' and formed in the wiring sub-area LA in a first thickness, where the actual sealing layer 192 is formed in the sealing sub-area SA with a second thickness that is greater than the first thickness.

The dummy sealing layer 192a makes direct contact with the protection layer 130 formed on the wiring sub-area LA. The dummy sealing layer 192a may prevent the protection layer 130 and the insulation layer 110, which are formed at a crossing area of the wirings in the wiring sub-area LA, from being damaged due to cracks. In addition, the dummy sealing layer 192a may prevent circuit defects from being generated due to formed cracks. It is to be understood that the dummy sealing layer 192a formed in the wiring sub-area LA does not perform a liquid crystal containment function, and the sealing layer 192 formed on the sealing area SA performs the sealing and containment function.

Thus, reliability of the gate driving part formed on the display substrate 200 may be improved.

A manufacturing process sequence of the display substrate 200 according to Embodiment 2 is not limited to a process sequence as described in FIGS. 8A to 8D, and the process sequence may be varied in a variety of manners.

Figure 9:
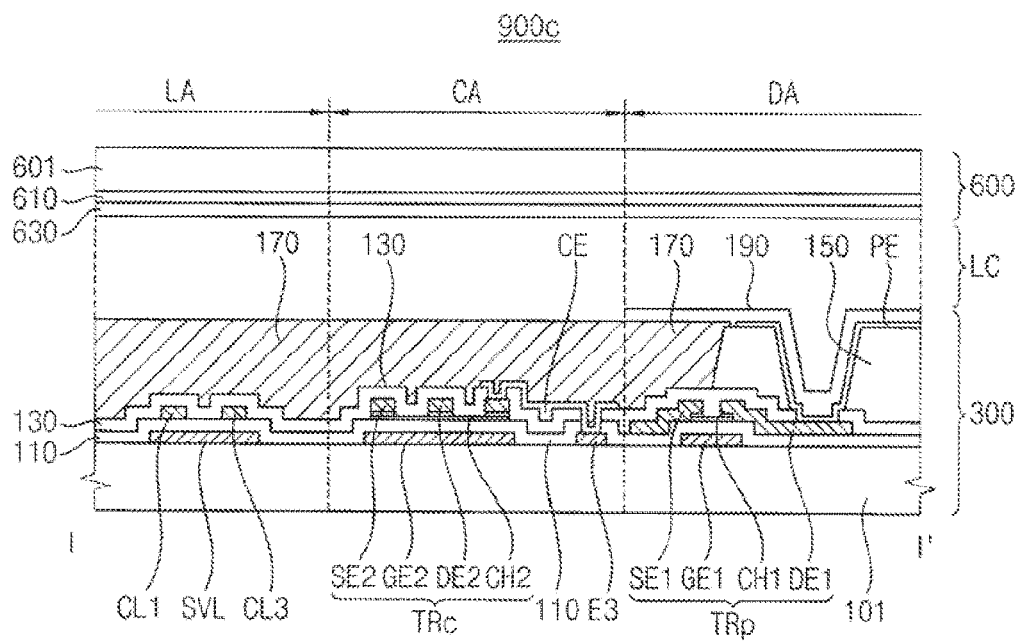
FIG. 9 is a cross-sectional view of a display device according to still another exemplary embodiment of the present invention.

FIG. 9 is a cross-sectional view of a display device according to still another exemplary embodiment.

Referring to FIGS. 3 and 9, the display device 900c includes a display substrate 300, an opposite substrate 600 facing the display substrate 300, and a liquid crystal layer LC disposed between the display substrate 300 and the opposite substrate 600.

The display substrate 300 includes a first base substrate 101.

A pixel transistor TRp, a color filter 150, a pixel electrode PE, a light-blocking layer 170 and a first alignment layer 190 are formed on the display area DA of the first base substrate 101. For example, the pixel transistor TRp includes a first electrode formed from a first metal layer, a first channel portion CH1 disposed on the first gate electrode GE1, an insulation layer disposed between the first gate electrode GE1 and the first channel portion CH1, a first source electrode SE1 disposed on the first gate electrode GE1 and the first channel portion CH1, and a first drain electrode DE1 disposed on the first gate electrode GE1 and the first channel portion CH1. The first gate electrode GE1 is electrically connected to the gate wiring GL, and the first source electrode SE1 is electrically connected to the data wiring DL.

A protection layer 130 is disposed on the first base substrate 101 on which the pixel transistor TRp is disposed.

The color filter 150 is disposed on the protection layer 130 in correspondence with a pixel area.

The pixel electrode PE is disposed on the color filter 150 in correspondence with the pixel area. The pixel electrode PE contacts to the first drain electrode DE1 through a contact hole formed through the protection layer 130, so that the pixel electrode PE electrically connects with the pixel transistor TRp.

The light-blocking layer 170' is disposed on the protection layer 130 in correspondence with an area where the pixel transistor TRp is positioned. The light-blocking layer 170' may be continued so as to be disposed on the protection layer 130 in correspondence within an area where the data wiring DL and the gate wiring GL are formed and also in the CA and/or LA sub-areas.

The first alignment layer 190 is disposed on the light-blocking layer 170 and the pixel electrode PE. The first alignment layer 190 formed in the display area DA initially aligns liquid crystal molecules of the liquid crystal layer LC.

The stage SRC1 and the extended light-blocking layer 170' are formed in the circuit sub-area CA of the first base substrate 101. The light-blocking layer 170' serves as a buffer layer for protecting the stage SRC1.

The stage SRC1 includes a connection electrode CE electrically connecting the circuit transistors TRc with each other. The circuit transistor TRc includes a second gate electrode GE2 formed from the first metal layer, a second channel portion CH2 disposed on the second gate electrode GE2, an insulation layer 110 disposed between the second gate electrode GE2 and the second channel portion CH2, a second source electrode SE2 disposed on the second channel portion CH2 and a second drain electrode DE2. The protection layer 130 is disposed on the circuit transistor TRc.

The connection electrode CE and the pixel electrode PE are formed from an identical conductive layer. The connection electrode CE electrically connects with an electrode formed from the first metal layer and an electrode formed from the second metal layer through a contact hole formed through the insulation layer 110 and the protection layer 130.

The extended light-blocking layer 170' formed in the circuit sub-area CA makes direct contact with the protection layer 130 and the connection electrode CE. The light-blocking layer 170 may prevent liquid crystal from infiltrating into the stage SRC1.

The signal wirings VSS, CKL1, CKL2, CKL3, CKL4 and SVL, the connection wirings CL1, CL2 and CL3, the protection layer 130 and the light-blocking layer 170 are formed in the wiring sub-area LA of the first base substrate 101. The light-blocking layer 170' serves as a buffer layer for protecting the protection layer 130.

The connection wirings CL1, CL2 and CL3 are extended in a second direction crossing the first direction to be formed from the first metal layer. The connection wirings CL1, CL2 and CL3 cross the first and second clock wirings CKL1 and CKL2 and the start wiring SVL that are formed from the second metal layer. The insulation layer 110 is disposed between the first metal layer and the second metal layer.

The protection layer 130 is formed on the first base substrate 101 on which the connection wirings CL1, CL2 and CL3 are formed.

The light-blocking layer 170 is formed on the protection layer 130 to make direct contact with the protection layer 130.

The extended light-blocking layer 170' formed in the wiring sub-area LA is formed from a polymer material that is different from the insulation layer 110 and the protection layer 130, so that the light-blocking layer 170 may protect the insulation layer 110 and the protection layer 130.

When the display device is driven at a high temperature and a high voltage, stress applied to the protection layer 130 and the insulation layer 110 is decreased due to a difference of thermal expansion coefficients between the wirings and protection layer 130, so that crack of the protection layer 130 and the insulation layer 110 may be initiated. The polymer material having flexibility has the quality which is excellent in the crack prevention. When a nascent crack is generated in the protection layer 130, the extended light-blocking layer 170' may prevent liquid crystal molecules from infiltrating into a metal wiring through the nascent crack. Moreover, the light-blocking layer 170 may prevent the protection layer 130 that is an inorganic insulation material from being damaged by a washing process and so one. Furthermore, the light-blocking layer 170 may prevent the protection layer 130 and the insulation layer 110 from being damaged by an external static electricity discharge.

The opposite substrate 600 includes a second base substrate 601, a common electrode 610 and a second alignment layer 630. The common electrode 610 is disposed on the second base substrate 601. The second alignment layer 630 is disposed on the common electrode 610 to initially align liquid crystal molecules.

FIGS. 10A, 10B, 10C and 10D are cross-sectional views showing a method of manufacturing the display device of FIG. 9.

Figure 10A:
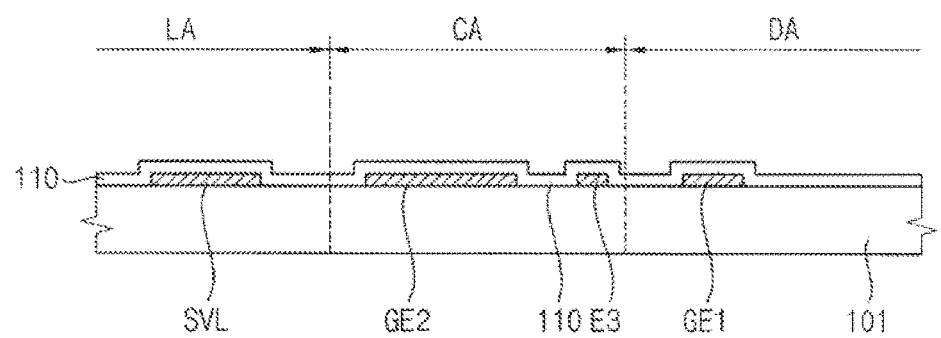
FIGS. 10A, 10B, 10C and 10D are cross-sectional views showing a method of manufacturing the display device of FIG. 9.

Referring to FIGS. 3, 9 and 10A, a first metal layer is formed on a first base substrate 101, and then the first metal layer is patterned to form a first metal pattern on the first base substrate 101. The first metal pattern includes a gate wiring GL and a first gate electrode GE1 of a pixel transistor TRp that are formed in the display area DA, a second gate electrode GE2 of a circuit transistor TRc formed in the circuit sub-area CA, a voltage wiring VL formed in the wiring sub-area LA, and a plurality of connection wirings CL1, CL2 and CL3 formed in the wiring sub-area LA.

An insulation layer 110 is formed on the first base substrate 101 on which the first metal pattern is formed to cover the first metal pattern. The insulation layer 110 may include an inorganic insulation material such as a silicon oxide (SiOx) or a silicon nitride (SiNx).

Figure 10B:
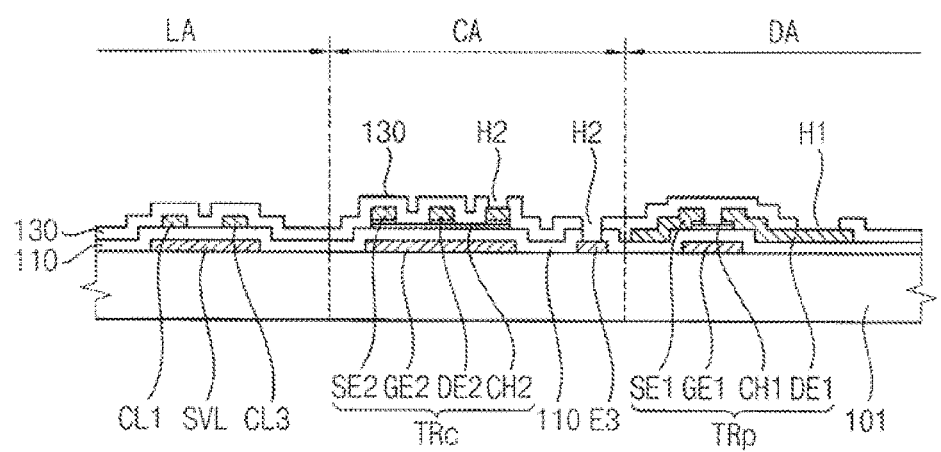

Referring to FIGS. 3, 9 and 10B, a channel layer is formed on the first base substrate 101 on which the insulation layer 110 is formed. The channel layer is patterned to form a channel pattern on the first base substrate 101. The channel pattern includes a first channel portion CH1 of the pixel transistor TRp formed on the display area DA and a second channel portion CH2 of the circuit transistor TRc formed in the circuit sub-area CA.

A second metal layer is formed on the first base substrate 101 on which the channel pattern is formed, and then the second metal layer is patterned to form a second metal pattern on the first base substrate 101.

The second metal pattern includes a data wiring DL and a first source electrode SE1 and a first drain electrode DE1 of the pixel transistor TRp that are formed in the display area DA. In addition, the second metal pattern includes a second source electrode SE2 and a second drain electrode DE2 of the circuit transistor TRc that are formed in the circuit sub-area CA. In addition, the second metal pattern includes a first clock wiring CKL1, a second clock wiring CKL2, a third clock wiring CKL3, a fourth clock wiring CKL4 and a starting wiring SVL that are formed in the wiring sub-area LA.

A protection layer 130 is formed on the first base substrate 101 on which the second metal pattern is formed so as to cover the second metal pattern. The protection layer 130 may include an inorganic insulation material such as a silicon oxide (SiOx) or a silicon nitride (SiNx).

A first contact hole H1 is formed through the protection layer 130 corresponding to the display area DA through an etching process, and then a second contact hole H2 is formed through the protection layer 130 corresponding to the circuit sub-area CA and the wiring sub-area LA.

Figure 10C:
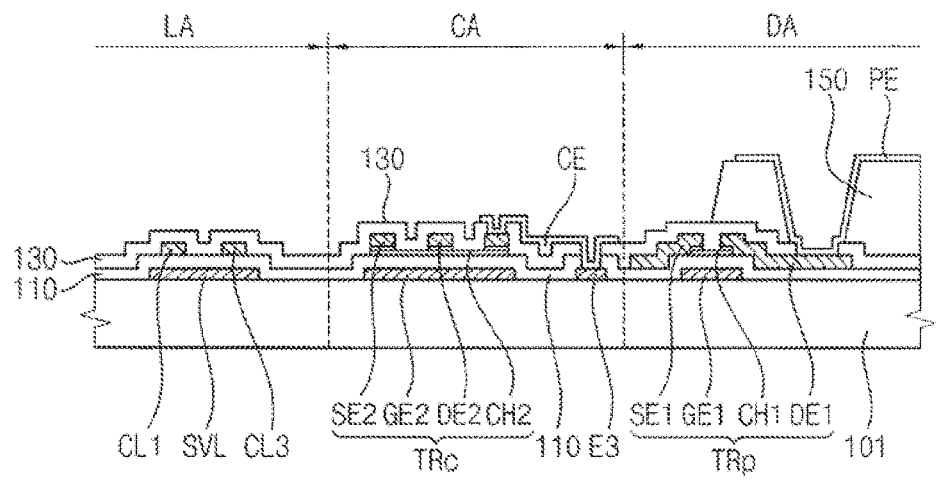

Referring to FIGS. 3, 9 and 10C, a color photo material (PR) is formed on the protection layer 130 through which the first and second contact holes H1 and H2 are formed, and then the color photo material is patterned to form a color filter 150 on a pixel area. The color filter may include a red color filter, a green color filter, a blue color filter, etc.

A transparent conductive layer is formed on the first base substrate 101 on which the color filter 150 is formed, and then the transparent conductive layer is patterned to form a transparent electrode pattern.

The transparent electrode pattern includes a pixel electrode PE formed in the pixel area DA and a connection electrode CE that is formed in the circuit sub-area CA and the wiring sub-area LA. The pixel electrode PE is disposed on the color filter 150.

Figure 10D:
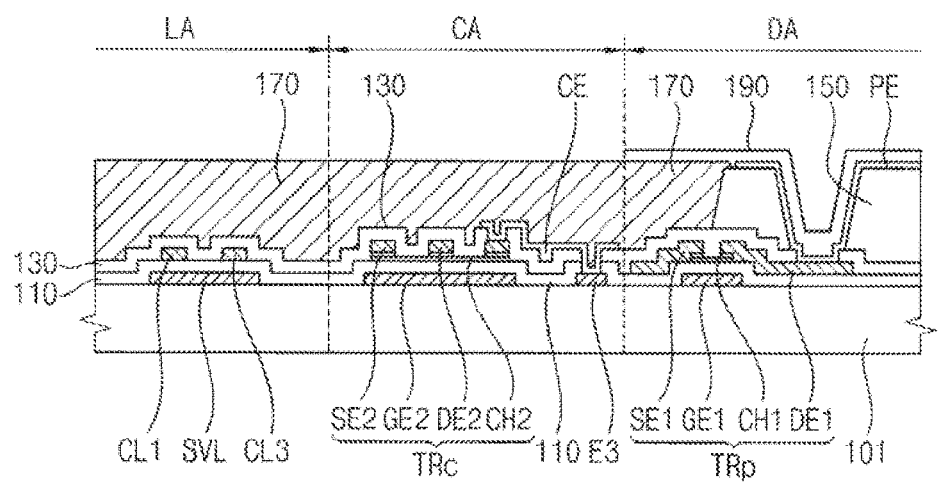

Referring to FIGS. 3, 9 and 10D, a light-blocking material is formed on the first base substrate 101 on which the transparent electrode pattern is formed, and then the light-blocking material is patterned to form a light-blocking layer 170 in the display area DA, the circuit sub-area CA and the wiring sub-area LA. The extended light-blocking layer 170' may be formed in accordance with areas where the data wirings DL, the gate wirings GL and the pixel transistors TRp are formed.

In the circuit sub-area CA and the wiring sub-area LA, the extended light-blocking layer 170' is formed on the protection layer 130 and the connection electrode CE to make direct contact with the protection layer 130 and the connection electrode CE.

A first alignment layer 190 is formed on the first base substrate 101 on which the light-blocking layer 170 is formed. The first alignment layer 190 is formed on the display area DA. The first alignment layer 190 is not formed on the circuit sub-area CA and the wiring sub-area LA. Alternatively, the first alignment layer 190 is extended to the circuit sub-area CA or the wiring sub-area LA to be formed on the light-blocking layer 170.

The light-blocking layer 170 formed on the circuit sub-area CA and the wiring sub-area LA is formed on the protection layer 130 to make direct contact with the protection layer 130 and the connection electrode CE. The light-blocking layer 170 may protect the protection layer 130 and the insulation layer 110 that are formed in the circuit sub-area CA and the wiring sub-area LA. For example, the light-blocking layer 170 may prevent the protection layer 130 and the insulation layer 110, which are formed at a crossing area of the wirings in the wiring sub-area LA, from being damaged due to the crack. In addition, the light-blocking layer 170 may prevent defects from generating due to the crack.

Thus, reliability of the gate driving part formed on the display substrate 300 may be improved.

A manufacturing process sequence of the display substrate 200 according to Embodiment 3 is not limited to a process sequence as described in FIGS. 10A to 10D, and the process sequence may be varied in a variety of manners.

Figure 11:
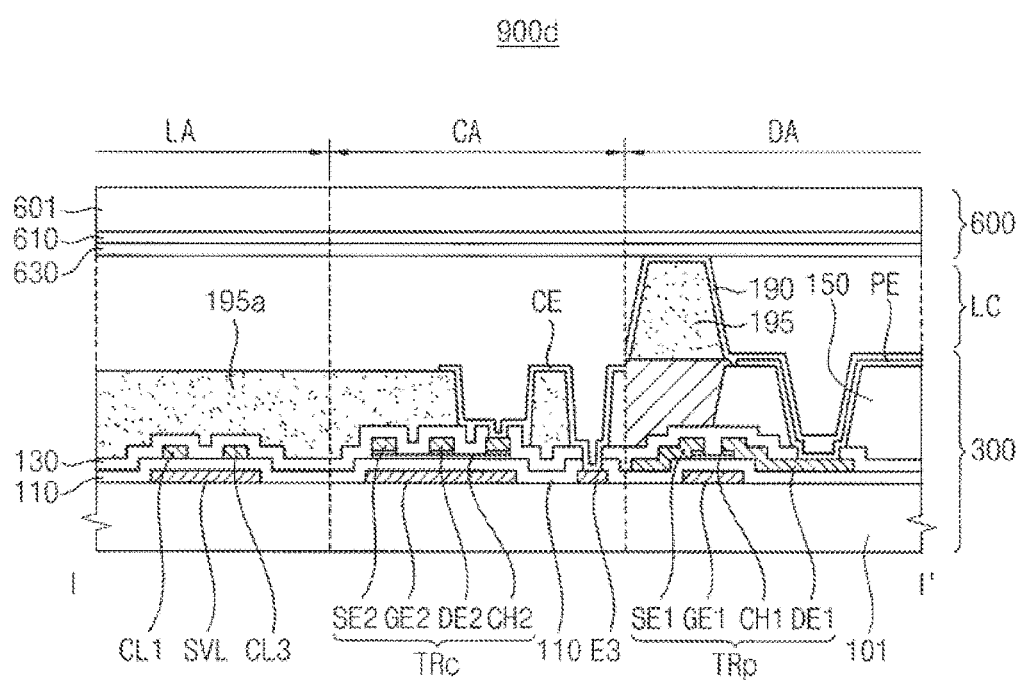
FIG. 11 is a cross-sectional view of a display device according to further still another exemplary embodiment of the present invention.

FIG. 11 is a cross-sectional view of a display device according to further still another exemplary embodiment.

Referring to FIGS. 3 and 11, the display device 900d includes a display substrate 400, an opposite substrate 600 facing the display substrate 400, and a liquid crystal layer LC disposed between the display substrate 400 and the opposite substrate 600.

The display substrate 400 includes a first base substrate 101.

A pixel transistor TRp, a color filter 150, a pixel electrode PE, a light-blocking layer 170, a separation maintaining part 195 and a first alignment layer 190 are formed on the display area DA of the first base substrate 101.

For example, the pixel transistor TRp includes a first gate electrode GE1 formed from a first metal layer, a first channel portion CH1 disposed on the first gate electrode GE1, an insulation layer 110 disposed between the first gate electrode GE1 and the first channel portion CH1, a first source electrode SE1 disposed on the first channel portion CH1 and a first drain electrode DE1 disposed on the first channel portion CH1. The first gate electrode GE1 is electrically connected to the gate wiring GL, and the first source electrode SE1 is electrically connected to the data wiring DL.

A protection layer 130 is disposed on the first base substrate 101 on which the pixel transistor TRp is disposed.

The color filter 150 is disposed in a pixel area on the protection layer 130.

The pixel electrode PE is disposed on the color filter 150 in correspondence with the pixel area. The pixel electrode PE contacts to the first drain electrode DE1 through a contact hole formed through the protection layer 130, so that the pixel electrode PE electrically connects to the pixel transistor TRp.

The light-blocking layer 170 is disposed on the protection layer 130 in correspondence with an area where the pixel transistor TRp is positioned. The light-blocking layer 170 may be disposed on the protection layer 130 in correspondence with an area where the data wiring DL and the gate wiring GL are formed. Alternatively, the light-blocking layer 170 may be formed on the display area DA in correspondence with a plurality of pixel electrodes in a lattice pattern.

The separation maintaining part 195 (also hereinafter, spacer 195) is disposed on an area where the pixel transistor TRp, that is on the light-blocking layer 170. The maintaining part 195 uniformly maintains a cell gap dimension of the liquid crystal layer LC disposed between the display substrate 400 and the opposite substrate 600.

The first alignment layer 190 is disposed on the first base substrate 101 on which the maintaining part 195 is formed. The first alignment layer 190 initially aligns liquid crystal molecules of the liquid crystal layer LC when no electric field is present.

The integrated gate driving circuitry (e.g., stage SRC1) and a dummy extension portion 195a of the material of the separation-maintaining part 195 are formed in the circuit sub-area CA of the first base substrate 101. The dummy extension portion 195a (also hereinafter, dummy maintaining layer 195a) serves as a supplemental buffer layer for protecting the integrated gate driving circuitry (e.g., stage SRC1) and its associated wirings (in LA).

The integrated gate driving circuitry (e.g., stage SRC1) includes a connection electrode CE electrically connecting the circuit transistors TRc with each other. The circuit transistors TRc each includes a second gate electrode GE2 formed from the first metal layer, a second channel portion CH2 disposed on the second gate electrode GE2, an insulation layer 110 disposed between the second gate electrode GE2 and the second channel portion CH2, a second source electrode SE2 disposed on the second channel portion CH2 and a second drain electrode DE2. The protection layer 130 is disposed on the circuit transistor TRc.

The connection electrodes CE and the pixel electrodes PE are formed from an identical conductive layer (e.g., a transparent ITO or IZO layer). The connection electrode CE electrically connects to an electrode formed from the first metal layer and an electrode formed from the second metal layer through a contact hole formed through the insulation layer 110 and the protection layer 130.

The dummy maintaining layer 195a formed in the circuit sub-area CA makes direct contact with the protection layer 130 and the connection electrode CE. The dummy maintaining layer 195a may include a material identical as the maintaining part 195 formed in the display area DA. The material of the spacer 195 may be a polymer having properties useful for supplementing the protection function of protection layer 130 including for preventing a fully open crack from developing. The dummy maintaining layer 195a may thus help prevent liquid crystal material from infiltrating into the integrated gate driving circuitry (e.g., stage SRC1) and/or its associated wirings (in LA).

The signal wirings VSS, CKL1, CKL2, CKL3, CKL4 and SVL, the connection wirings CL1, CL2 and CL3, the protection layer 130 and the dummy maintaining layer 195a are formed in the wiring sub-area LA of the first base substrate 101. The dummy maintaining layer 195a serves as a supplemental buffer layer for protecting the protection layer 130.

The connection wirings CL1, CL2 and CL3 are extended in a second direction crossing the first direction to be formed from the first metal layer. The connection wirings CL1, CL2 and CL3 cross the first and second clock wirings CKL1 and CKL2 and the start wiring SVL that are formed from the second metal layer. The insulation layer 110 is disposed between the first metal layer and the second metal layer.

The protection layer 130 is formed on the first base substrate 101 on which the connection wirings CL1, CL2 and CL3 are formed.

The dummy maintaining layer 195a is formed on the protection layer 130 to make direct contact with the protection layer 130.

The dummy maintaining layer 195a formed in the wiring sub-area LA is formed from a polymer material that is different from the insulation layer 110 and the protection layer 130, so that the dummy maintaining layer 195a may provide supplemental protection to the insulation layer 110 and to the protection layer 130.

When the display device is driven at a high temperature and a high voltage, stress may be applied to the protection layer 130 and the insulation layer 110 due to differences of thermal expansion coefficient between the wirings and protection layer 130, so that a nascent crack into the protection layer 130 and the insulation layer 110 may develop. However, the polymer material of the dummy spacer portion 195a is selected to have flexibility or deformability or resilience of a quality which is excellent in helping to prevent or seal cracks. Thus even when a nascent crack is generated in the protection layer 130, the dummy maintaining layer 195a may work to prevent liquid crystal molecules from infiltrating into contact with a metal wiring through the crack. Moreover, the dummy maintaining layer 195a may prevent the protection layer 130 that is an inorganic insulation material from being damaged by corrosive agents such as may be present in a washing or other mass production process and so one. Furthermore, the dummy maintaining layer 195a may prevent the protection layer 130 and the insulation layer 110 from being damaged by an external static electricity discharge.

The opposite substrate 600 includes a second base substrate 601, a common electrode 610 and a second alignment layer 630. The common electrode 610 is disposed on the second base substrate 601. The second alignment layer 630 is disposed on the common electrode 610 to initially align liquid crystal molecules.

FIGS. 12A, 12B, 12C and 12D are cross-sectional views illustrating a method of manufacturing a display substrate of FIG. 11.

Figure 12A:
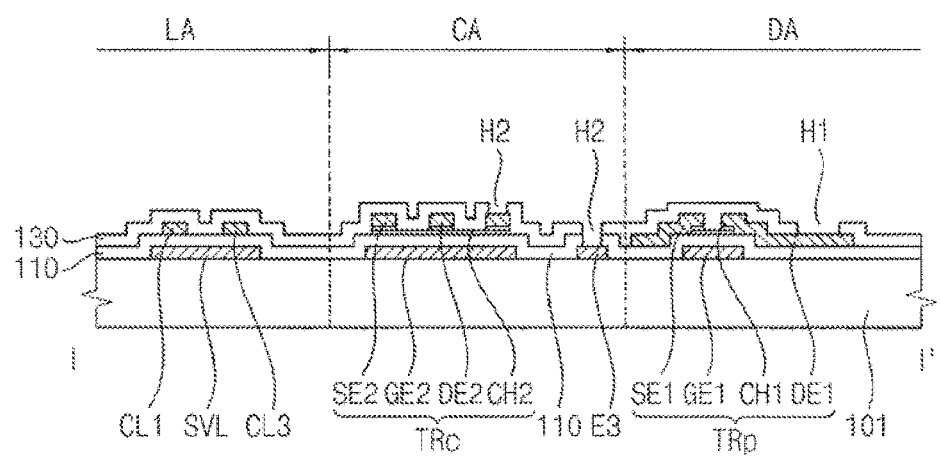
FIGS. 12A, 12B, 12C and 12D are cross-sectional views illustrating a method of manufacturing a display substrate of FIG. 11.

Referring to FIGS. 3, 11 and 12A, a first metal layer is formed on a first base substrate 101, and then the first metal layer is patterned to form a first metal pattern on the first base substrate 101. The first metal pattern includes a gate wiring GL and a first gate electrode GE1 of a pixel transistor TRp that are formed on the display area DA, a second gate electrode GE2 of a circuit transistor TRc formed in the circuit sub-area CA, a voltage wiring VL formed in the wiring sub-area LA, and a plurality of connection wirings CL1, CL2 and CL3 formed in the wiring sub-area LA.

An insulation layer 110 is formed on the first base substrate 101 on which the first metal pattern is formed to cover the first metal pattern. The insulation layer 110 may include an inorganic insulation material such as a silicon oxide (SiOx) or a silicon nitride (SiNx).

A channel layer is formed on the first base substrate 101 on which the insulation layer 110 is formed. The channel layer is patterned to form a channel pattern on the first base substrate 101. The channel pattern includes a first channel portion CH1 of the pixel transistor TRp formed in the display area DA and a second channel portion CH2 of the circuit transistor TRc formed in the circuit sub-area CA.

A second metal layer is formed on the first base substrate 101 on which the channel pattern is formed, and then the second metal layer is patterned to form a second metal pattern on the first base substrate 101.

The second metal pattern includes a data wiring DL and a first source electrode SE1 and a first drain electrode DE1 of the pixel transistor TRp that are formed on the display area DA. In addition, the second metal pattern includes a second source electrode SE2 and a second drain electrode DE2 of the circuit transistor TRc that are formed in the circuit sub-area CA. In addition, the second metal pattern includes a first clock wiring CKL1, a second clock wiring CKL2, a third clock wiring CKL3 and a fourth clock wiring CKL4 that are formed in the wiring sub-area LA.

A protection layer 130 is formed on the first base substrate 101 on which the second metal pattern is formed so as to cover the second metal pattern. The protection layer 130 may include an inorganic insulation material such as a silicon oxide (SiOx) or a silicon nitride (SiNx).

A first contact hole H1 is formed through the protection layer 130 corresponding to the display area DA through an etching process, and then a second contact hole H2 is formed through the protection layer 130 corresponding to the circuit sub-area CA and the wiring sub-area LA.

Figure 12B:
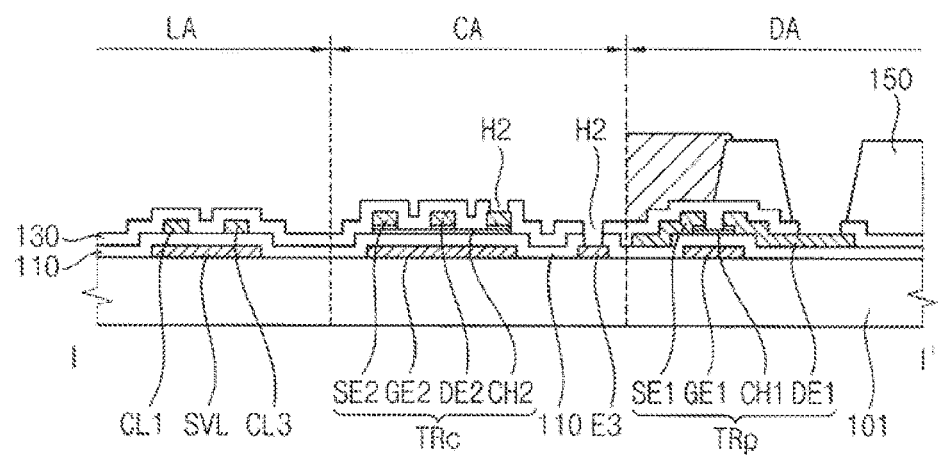

Referring to FIGS. 3, 11 and 12B, a color photo material (PR) is formed on the protection layer 130 through which the first and second contact holes H1 and H2 are formed, and then the color photo material is patterned to form a color filter 150 on a pixel area. The color filter may include a red color filter, a green color filter, a blue color filter, etc.

A light-blocking material is formed on the first base substrate 101 on which the color filter 150 is formed, and then the light-blocking material is patterned to form a light-blocking layer 170 on the display area DA. The light-blocking layer 170 may be formed in accordance with areas where the data wirings DL, the gate wirings GL and the pixel transistors TRp are formed.

Figure 12C:
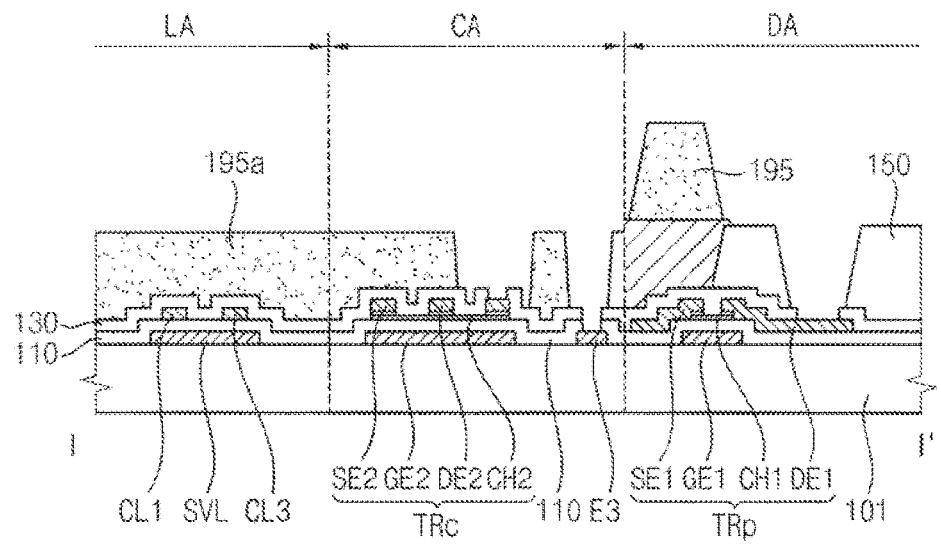

Referring to FIGS. 3, 11 and 12C, a column spacer material is formed on the first base substrate 101 on which the light-blocking layer 170 is formed, and then the column spacer material is patterned to form the separation-maintaining part 195 in the display area DA and to form the dummy maintaining layer 195a in the circuit and wiring sub-areas, CA and LA. The column spacer material may include an inorganic insulation material, an organic insulation material, etc.

The dummy maintaining layer 195a formed in the circuit sub-area CA and the wiring sub-area LA is formed on the protection layer 130 to make direct contact with the protection layer 130 and the connection electrode CE. The dummy maintaining layer 195a may protect the protection layer 130 and the insulation layer 110 that are formed on the circuit sub-area CA and the wiring sub-area LA. For example, the dummy maintaining layer 195a may prevent the protection layer 130 and the insulation layer 110, which are formed at a crossing area of the wirings in the wiring sub-area LA, from being damaged due to formation of nascent cracks. In addition, the dummy maintaining layer 195a may prevent further defects from developing due to formation of a nascent crack.

Figure 12D:
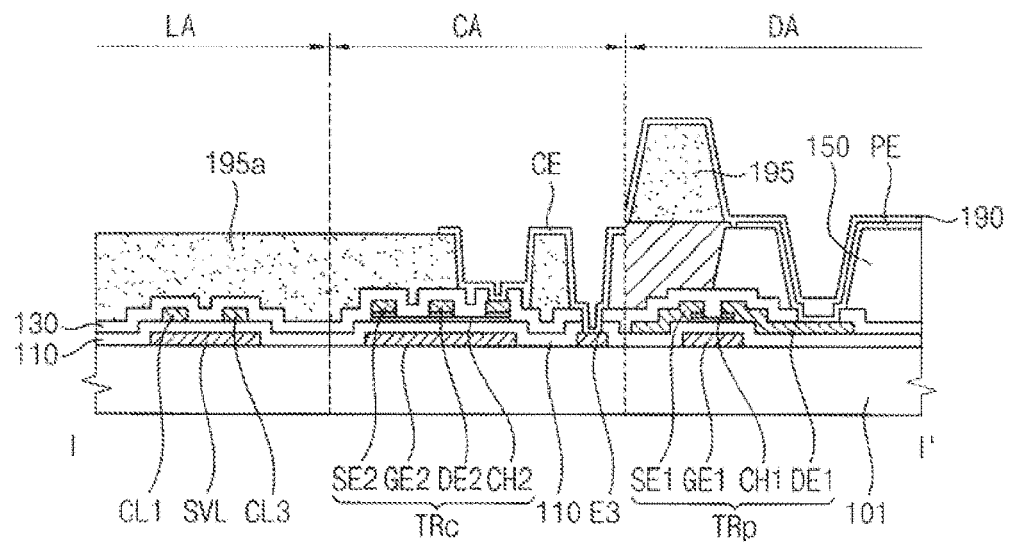

Referring to FIGS. 3, 11 and 12D, a transparent conductive layer is formed on the first base substrate 101 on which the maintaining part 195 and the dummy maintaining layer are formed, and then the transparent conductive layer is patterned to form a transparent electrode pattern.

The transparent electrode pattern includes a pixel electrode PE formed in the pixel area DA, and a connection electrode CE formed in the circuit sub-area CA and the wiring sub-area LA. The pixel electrode PE is disposed on the color filter 150.

The first alignment layer 190 is formed on the first base substrate 101 on which the transparent electrode pattern is formed. The first alignment layer 190 is formed in the display area DA. The first alignment layer 190 is not formed in the circuit sub-area CA and in the wiring sub-area LA. Alternatively, the first alignment layer 190 may be extended to be present in the circuit sub-area CA or in the wiring sub-area LA.

Thus, reliability of the gate driving part formed on the display substrate 400 may be improved due to the dummy maintaining layer 195a.

A manufacturing process sequence of the display substrate 400 according to Embodiment 4 is not limited to a process sequence as described in FIGS. 12A to 12D, and the process sequence may be varied in a variety of manners.

According to exemplary embodiments of the present teachings, a supplemental protection layer is formed directly on or sealingly over a primary protection layer (130) so as to provide supplementing protection functionality in terms of flexibility and/or resistance to corrosive chemical agents. The supplemental protection layer may be formed as an extension of or from the material of one or more of an alignment layer, a sealing layer, a light-blocking layer and a separation maintaining layer. The supplemental protection layer may be formed to serve as a buffer layer for preventing formation of defects in an integrated gate driving circuitry and its associated wirings so that circuit degradation and wiring defects may be prevented. Therefore, reliability of the gate driving part may be improved.

The foregoing is illustrative of the present disclosure and is not to be construed as limiting thereof. Although a few example embodiments have been described, those skilled in the pertinent art will readily appreciate in light of the foregoing that many modifications are possible in the example embodiments without materially departing from the novel teachings and advantages of the present disclosure. Accordingly, all such modifications are intended to be included within the scope of the present teachings. In the claims, means-plus-function clauses are intended to cover the structures described herein as performing the recited function and not only structural equivalents but also functionally equivalent structures.

What is claimed is:

1. A display device comprising:
a pixel transistor disposed on a substrate in a display area and including a gate electrode, a source electrode and a drain electrode;
an integrated driving circuit disposed in a peripheral area adjacent to the display area, the integrated driving circuit comprising a transistor part, a first wiring part extending in a first direction and electrically connected to the transistor part, and a second wiring part extending in a second direction to cross the first wiring part and electrically connected to the transistor part;
an insulation layer disposed between the first wiring part and the second wiring part;
a protection layer disposed on the second wiring part and the drain electrode;
a pixel electrode electrically connected to the drain electrode of the pixel transistor through an opening of the protection layer;
a separation maintaining part disposed on the pixel electrode; and
a buffer layer disposed over the protection layer, the buffer layer covering the transistor part and at least an area where the second wiring part crosses the first wiring part, and comprising a same material as the separation maintaining part.

2. The display device of claim 1, wherein the buffer layer includes a polymer.

3. The display device of claim 1, wherein the protection layer includes an inorganic material.

4. The display device of claim 3, wherein the protection layer includes at least one of silicon oxide and silicon nitride.

5. The display device of claim 1, wherein the transistor part includes a shift register including a plurality of stages.

6. The display device of claim 5, wherein the transistor part is disposed between the second wiring part and the display area.

7. The display device of claim 5, wherein the first wiring part is configured to deliver at least one clock signals to the shift register.

8. The display device of claim 5, further comprising a gate line electrically connected to the gate electrode of the pixel transistor, and
wherein the shift register is configured to provide a gate signal to the gate line.

9. The display device of claim 8, wherein the first wiring part extends in a direction substantially parallel to the data line, and the second wiring part extends in a direction substantially parallel to the gate line.

10. The display device of claim 1, wherein the first wiring part includes a same material as the gate electrode of the pixel transistor, and the second wiring part includes a same material as the source electrode or the drain electrode of the pixel transistor.

11. The display device of claim 1, wherein the second wiring part is disposed above the first wiring part.

12. A display device comprising:
a pixel transistor disposed on a substrate in a display area and including a gate electrode a source electrode and a drain electrode;
an integrated driving circuit disposed in a peripheral area adjacent to the display area, the integrated driving circuit comprising a transistor part, a first wiring part extending in a first direction and electrically connected to the transistor part, and a second wiring part extending in a second direction to cross the first wiring part and electrically connected to the transistor part;
an insulation layer disposed between the first wiring part and the second wiring part;
a protection layer disposed on the second wiring part and the drain electrode;
a pixel electrode electrically connected to the drain electrode of the pixel transistor through an opening of the protection layer;
a separation maintaining part disposed above the pixel transistor; and
a buffer layer disposed over the protection layer, the buffer layer covering the transistor part and at least an area where the second wiring part crosses the first wiring part, and comprising a same material as the separation maintaining part.

13. The display device of claim 12, wherein the buffer layer includes a polymer.

14. The display device of claim 12, wherein the protection layer includes an inorganic material.

15. The display device of claim 12, wherein the second wiring part is disposed above the first wiring part.

16. The display device of claim 12, wherein the first wiring part includes a same material as the gate electrode of the pixel transistor, and the second wiring part includes a same material as the source electrode or the drain electrode of the pixel transistor.

\* \* \* \* \*